US012712272B1

(12) United States Patent
Komandla et al.

(10) Patent No.: US 12,712,272 B1
(45) Date of Patent: *Aug. 18, 2026

(54) NOISE-IMMUNE MINIATURIZED ANTENNA

(71) Applicant: Amazon Technologies, Inc., Seattle, WA (US)

(72) Inventors: Mohana Vamshi Komandla, Sunnyvale, CA (US); Syed Abdullah Nauroze, Ottawa (CA); Peruvemba Ranganath Sai Ananthanarayanan, Fremont, CA (US); Hariharan Muthukrishnan, Milpitas, CA (US)

(73) Assignee: Amazon Technologies, Inc., Seattle, WA (US)

(*) Notice: Subject to any disclaimer, the term of this patent is extended or adjusted under 35 U.S.C. 154(b) by 38 days.

This patent is subject to a terminal disclaimer.

(21) Appl. No.: 18/828,227

(22) Filed: Sep. 9, 2024

Related U.S. Application Data

(63) Continuation of application No. 18/081,566, filed on Dec. 14, 2022, now Pat. No. 12,119,567.

(51) Int. Cl.
*H01Q 9/04* (2006.01)
*H01Q 5/335* (2015.01)

(52) U.S. Cl.
CPC ........... *H01Q 9/0421* (2013.01); *H01Q 5/335* (2015.01)

(58) Field of Classification Search
CPC .......... H01Q 9/42; H01Q 1/02; H01Q 1/2291; H01Q 1/44; H01Q 1/002; H01Q 1/243; H01Q 13/106; H01Q 21/28; H01Q 1/24; H01Q 13/10; H01Q 5/10; H01Q 5/30; H01Q 5/378; H01Q 7/00; H01Q 1/3233; H01Q 1/36; H01Q 1/48; H01Q 13/16; H01Q 13/18; H01Q 13/22; H01Q 21/005; H01Q 21/20; H01Q 5/335; H01Q 5/42; H01Q 9/0421
See application file for complete search history.

(56) References Cited

U.S. PATENT DOCUMENTS

2019/0190115 A1* 6/2019 Samardzija .............. H01Q 9/42
2021/0075106 A1* 3/2021 Samardzija ............ H01Q 5/378

* cited by examiner

*Primary Examiner* — Monica C King
(74) *Attorney, Agent, or Firm* — K&L Gates LLP

(57) ABSTRACT

Technologies directed to a noise-immune miniaturized antenna (NIMA) structure in a main logic board (MLB) and diverting surface currents from the MLB to a metal structure to reduce noise coupling from a chipset on the MLB to the NIMA structure are described. The NIMA structure is located at a side of the MLB and includes a first tuning component coupled to a distal end of a radiating arm of the NIMA structure and a second tuning component coupled to a distal end of a shorting arm of the NIMA structure. The NIMA structure radiates in a first frequency range and a second frequency range. A conductive fastener couples the MLB to a metal structure to divert surface currents from the MLB to the metal structure.

20 Claims, 29 Drawing Sheets

400

1004

1102

NOISE-IMMUNE MINIATURIZED ANTENNA

RELATED APPLICATIONS

This application is a continuation of U.S. patent application Ser. No. 18/081,566, filed Dec. 14, 2022, the entire contents of which are incorporated by reference herein.

BACKGROUND

An antenna can be integrated into a printed circuit board (PCB). One potential reason for using a PCB antenna is to reduce cost. The antenna can be printed directly on the board. However, PCB layouts can be complex, and space on a PCB is often constrained. There can be challenges with the antenna in a PCB antenna, including the size of the antenna, which is proportional to performance, and noise coupling from other circuitry of the PCB to the antenna. The effective length of an antenna that operates at the 2.4 GHz frequency is approximately 28.8 to 32 mm long, which adds to the overall footprint size of the PCB antenna. Due to the noise coupling between the PCB antenna and the other circuitry of the PCB, additional mechanisms may be needed to isolate the PCB antenna from the other circuitry. These other mechanisms increase the cost of the design.

BRIEF DESCRIPTION OF THE SEVERAL VIEWS OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
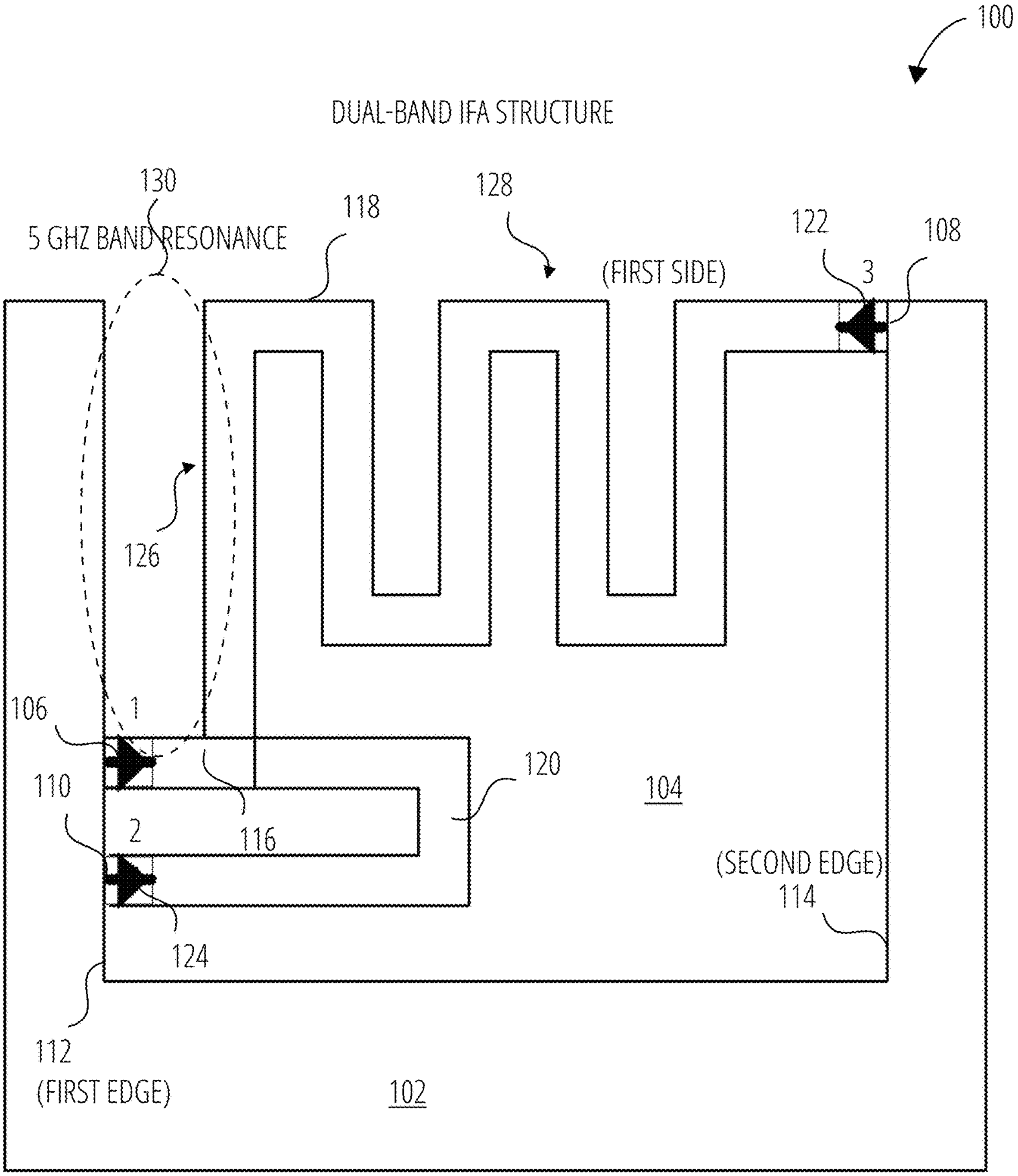
FIG. 1A illustrates a dual-band Inverted-F antenna (IFA) structure according to at least one embodiment.

Technologies directed to a noise-immune miniaturized antenna (NIMA) structure in a main logic board (MLB) and diverting surface currents from the MLB to a metal structure to reduce noise coupling from a chipset on the MLB to the NIMA structure are described. Various devices are described herein that include wireless local area network (WLAN) radios that operate in the 2.4 GHz, 5 GHz U-NII-1, and 6 GHz bands and utilize various WLAN protocols, such as the Wi-Fi® protocols (e.g., 802.11n, 802.11ac, or the like). As described above, PCB antennas can be cheaper than antennas external to the circuit board (referred to herein as external antennas). However, the PCB layout can be complex, and the space on the PCB is often constrained, leading to challenges with integrating an antenna in the PCB, including size and placement constraints and noise coupling with other active components of the PCB. Conventional WLAN antennas have been hard to integrate into PCBs, given the size and placement constraints and the difficulty in isolating the WLAN antennas from other circuitry on the PCB. The size and isolation requirements increase the cost of the design.

Aspects and embodiments of the present disclosure address the above and other deficiencies by providing a Noise Immune Miniaturized Antenna (NIMA) on a main logic board (MLB), such as a printed circuit board (PCB). The NIMA can be a dual-band antenna for a dual-band WLAN radio. The NIMA can be split into two concepts, including a noise-immune antenna design and a miniature antenna occupying a small surface area of the MLB. Aspects and embodiments of the present disclosure can provide a NIMA structure that fits within a surface area of 7 millimeters (mm) by 8 mm (7 mm×8 mm) on the MLB as a zero-cost design. The noise-immune antenna design can minimize noise coupling from other chipsets on the MLB to the antenna. In particular, the noise-immune antenna design fundamentally forms weak tangential surface currents on the MLB by the antenna itself, and the surface currents from the MLB can be diverted to other nearby structures, like a heatsink, a metal chassis, or other metals of a device. Aspects and embodiments of the present disclosure can improve desense performance by reducing mutual coupling between the antenna and noise source(s). Aspects and embodiments of the present disclosure can divert the surface currents by re-routing antenna or noise surface currents from the MLB to other nearby structures. Aspects and embodiments of the present disclosure can achieve a miniaturized antenna with a small footprint antenna on the MLB. In at least one embodiment, the NIMA structure is located at a side of the MLB and includes a first tuning component coupled to a distal end of a radiating arm of the NIMA structure and a second tuning component coupled to a distal end of a shorting arm of the NIMA structure. The first tuning component causes the NIMA structure to radiate electromagnetic energy in a first frequency range, and the second tuning component causes the NIMA structure to radiate electromagnetic energy in a second frequency range. In at least one embodiment, a conductive fastener couples the MLB to a metal structure to divert surface currents from the MLB to the metal structure. The surface currents can originate from the NIMA structure, active circuitry on or near the MLB, or other noise sources. The conductive fastener can be spring clips, conductive foams, screws, pins, stamped metal, conductive tape, solder joints, etc.

FIG. 1A illustrates a dual-band Inverted-F antenna (IFA) structure 100 according to at least one embodiment. The dual-band IFA structure 100 can be coupled to a radio, such as a dual-band wireless local area network (WLAN) radio, which can send or receive radio frequency (RF) signals in a first frequency range and a second frequency range. The dual-band IFA structure 100 can be part of a main logic board (MLB). The MLB can be a printed circuit board (PCB). The PCB can include a ground plane 102 with an opening 104 where the dual-band IFA structure 100 is located. The opening 104 can be located on a side of the ground plane 102. In this embodiment, the opening 104 is not located at a corner but at a more central location on the side of the ground plane 102.

In at least one embodiment, the dual-band IFA structure 100 includes a feed point 106 coupled to the dual-band radio, a first grounding point 108, and a second grounding point 110. The feed point 106 is located at a first edge 112 of the ground plane 102 adjacent to the opening 104. In at least one embodiment, an impedance-matching circuit (not illustrated in FIG. 1A) is coupled between the dual-band radio and the feed point 106. The first grounding point 108 is located at a second edge 114 of the ground plane 102 adjacent to the opening 104 and opposite the first edge 112. The second grounding point 110 is located at the first edge 112. The second grounding point 110 is farther away from the side than the feed point 106. The dual-band IFA structure 100 includes a feed arm 116 coupled to the feed point 106, a radiating arm 118 coupled to the feed arm 116 and the first grounding point 108, a shorting arm 120 coupled to the radiating arm 118, and the second grounding point 110. In at least one embodiment, the dual-band IFA structure 100 includes a first tuning component 122 coupled to a distal end of the radiating arm 118 and the first grounding point 108. In at least one embodiment, the first tuning component 122 includes at least a capacitor. The first tuning component 122 is configured to cause the dual-band IFA structure 100 to radiate electromagnetic energy in the first frequency range (e.g., 2.4 GHz frequency band) and a second tuning component 124 coupled to a distal end of the shorting arm 120 and the second grounding point 110. In at least one embodiment, the second tuning component 124 includes at least an inductor. The second tuning component 124 is configured to cause the dual-band IFA structure 100 to radiate electromagnetic energy in the second frequency range (e.g., 5 GHz frequency band). In at least one embodiment, the dual-band IFA structure 100 is a long plus short loop closed configuration. The long trace can be tuned (lowest band) to 2.4 GHz using a shunt capacitor (e.g., 0.1 pF). Without the capacitor, the longer trace fundamentally resonates at around 3.2 GHz. Using the capacitor between the open end of the trace and the ground plane (e.g., high voltage region), the dual-band IFA structure 100 can be tuned down to 2.4 GHz at the cost of bandwidth, yet still meeting −10 dB S11 bandwidth at 2.4-2.5 GHz.

In at least one embodiment, the radiating arm 118 has a first portion 126 of a conductive trace having a proximal end at the feed arm 116 and a distal end at the side. The first portion 126 of the conductive trace is parallel to the first edge 112. The first portion 126 of the conductive trace and the corresponding gap between the ground plane 102 contribute to a 5 GHz band resonance 130. The radiating arm 118 includes a second portion 128 of the conductive trace having a meandering path between a proximal end at the distal end of the first portion 126 of the conductive trace and a distal end at the first grounding point 108. The first portion 126 of the conductive trace and the second portion 128 of the conductive trace contribute to a 2.4 GHz band resonance (not illustrated in FIG. 1A).

Figure 12:
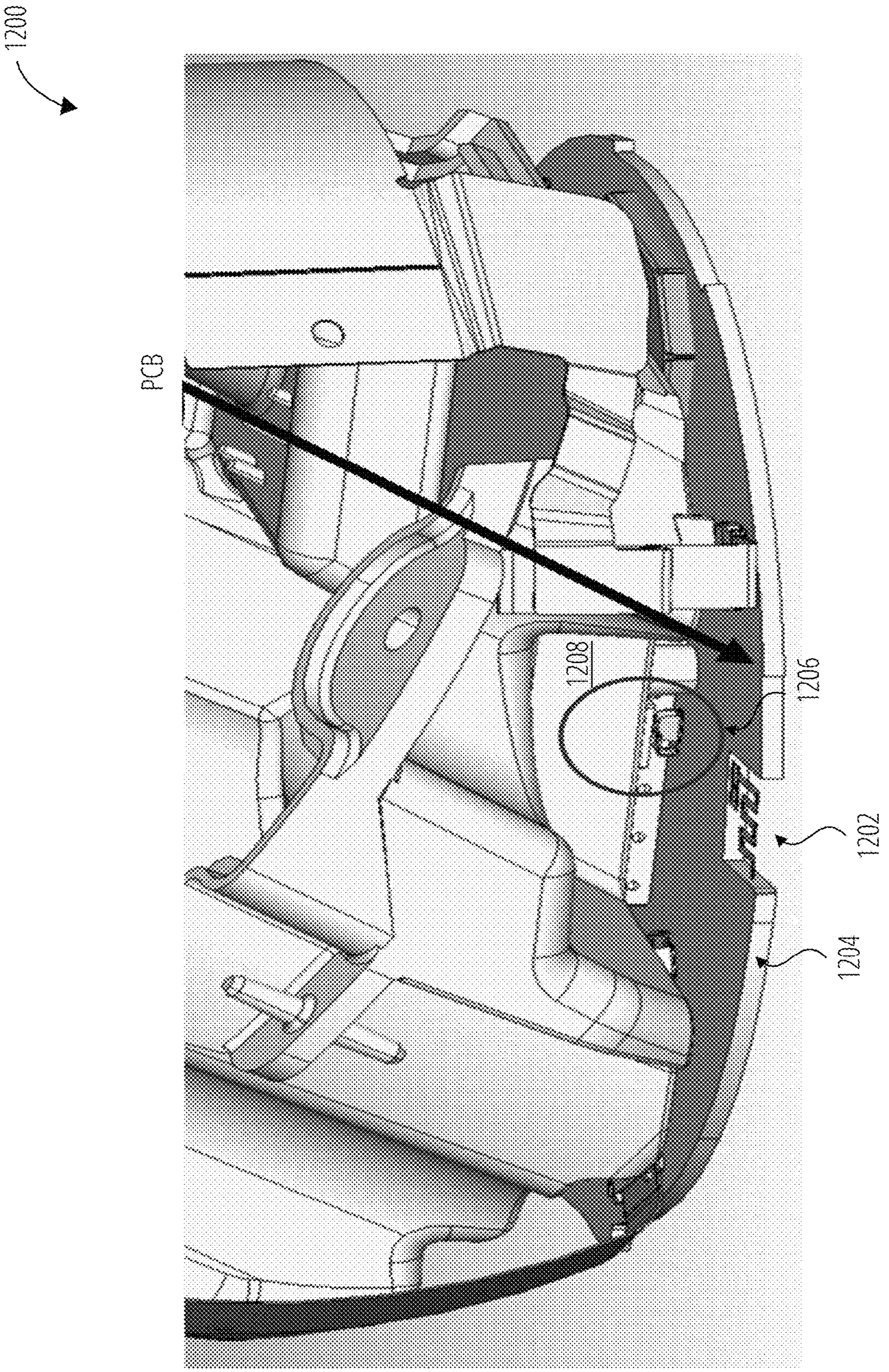
FIG. 12 illustrates a wireless device with a spring clip coupled between a metal structure and a printed circuit board (PCB) with a dual-band IFA structure according to at least one embodiment.

In at least one embodiment, the dual-band IFA structure 100 fits within the opening 104, having a height of 7 millimeters (mm) and a width of 8 mm. In at least one embodiment, active circuitry is located in a first region of the PCB containing the dual-band IFA structure 100. The dual-band IFA structure 100 is configured to generate a surface current having a null in the first region. In another embodiment, the dual-band IFA structure 100 is configured to generate a first surface current in response to the RF signals in the first frequency range and a second surface current in response to the RF signals in the second frequency range. The first and second surface currents have common portions of nulls at the first region. In at least one embodiment, the dual-band IFA structure 100 generates surface currents on the ground plane 102. Due to the antenna design, the surface currents on the PCB are small. In at least one embodiment, a conductive fastener is coupled between the PCB and a metal structure, as illustrated in FIG. 12. The conductive fastener can divert the surface currents from the ground plane 102 to the metal structure. In at least one embodiment, the conductive fastener is a conductive spring clip coupled between the ground plane 102 (or PCB) and a heatsink. One or more conductive spring clips can divert surface currents from the ground plane 102 (PCB), caused by the dual-band IFA structure 100, to the heatsink to minimize noise coupling from a circuit on or part of the PCB to the dual-band IFA structure 100.

In some embodiments, the conductive traces of the dual-band IFA structure 100 can be implemented on a single layer (e.g., on a same plane of the PCB). In another embodiment, the conductive traces of the dual-band IFA structure 100 can be implemented on multiple layers (e.g., on multiple planes of the PCB) using vias. In some cases, when using multiple layers, the width of the dual-band IFA structure 100 could be reduced.

As illustrated, the meandering path can include one or more folds, forming multiple u-shaped structures in the meandering path. In other embodiments, the meandering path can include more or less folds and can form different shapes, such as one or more v-shaped structures.

Figure 1B:
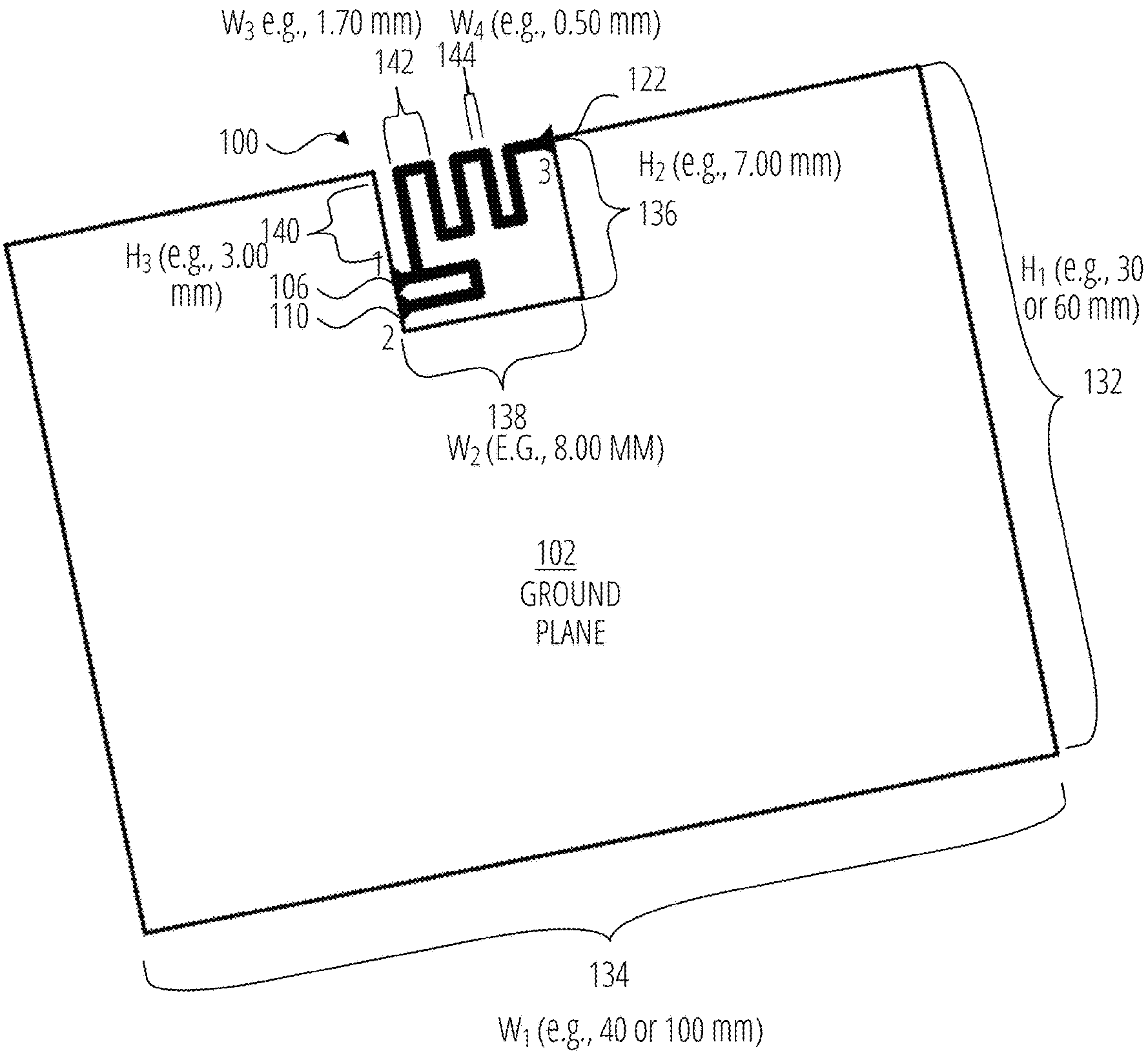
FIG. 1B illustrates the dual-band IFA structure located in an opening of a ground plane according to at least one embodiment.

FIG. 1B illustrates the dual-band IFA structure 100 located in an opening of the ground plane 102 according to at least one embodiment. In the illustrated embodiment, the ground plane 102 can have a first height 132 (e.g., 30 mm or 60 mm) and a first width 134 (e.g., 40 mm or 100 mm). The opening has a second height 136 (e.g., 7 mm) and a second width 138 (e.g., 8 mm). The dual-band IFA structure 100 fits within the second height 136 and the second width 138 of the opening. The second portion 128 of the conductive trace can have a third height 140 (e.g., 3 mm). Each meandering path can have a third width 142 (e.g., 1.7 mm). The second portion 128 of the conductive trace can have a fourth width 144 (e.g., 0.5 mm). The first portion 126 of the conductive trace can also have the same fourth width 144. Similarly, the feed arm 116 and the shorting arm 120 can have the fourth width 144. In at least one embodiment, the folded arm of the shorting arm has a same height as the third height 140 and the same width as the third width 142. Alternatively, other dimensions of the portions of the conductive traces can be used.

Figure 2:
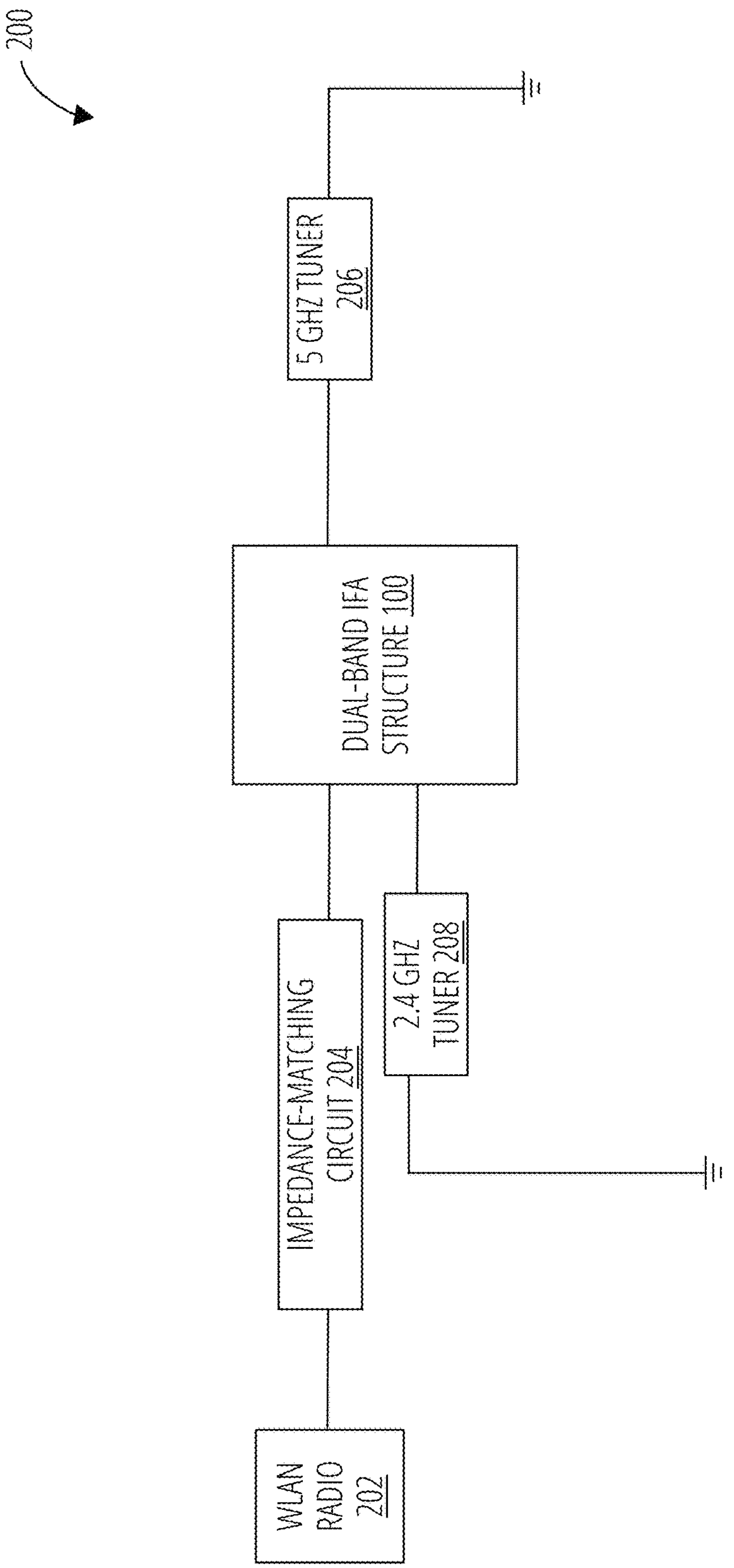
FIG. 2 is a block diagram of a wireless device with the dual-band IFA structure of FIG. 1A according to at least one embodiment.

FIG. 2 is a block diagram of a wireless device 200 with the dual-band IFA structure 100 of FIG. 1A according to at least one embodiment. The wireless device 200 includes a WLAN radio 202 coupled to the dual-band IFA structure 100 with an impedance-matching circuit 204. The dual-band IFA structure 100 can be coupled to the ground plane with s 5 GHz tuner 206 and a 2.4 GHz tuner 208. The impedance-matching circuit 204, 5 GHz tuner 206, and 2.4 GHz tuner 208 can be configured to impedance match and tune the dual-band IFA structure 100 to operate in the 2.4 GHz frequency band and the 5 GHz frequency band. In at least one embodiment, the 5 GHz tuner 206 is a shunt inductor and the 2.4 GHz tuner 208 is a shunt capacitor. In at least one embodiment, the 2.4 GHz tuner 208 is coupled at a distal end of the radiating arm 118 of dual-band IFA structure 100. The 2.4 GHz tuner 208 can be coupled between the dual-band IFA structure 100 and the first grounding point 108. In at least one embodiment, the 5 GHz tuner 206 is coupled at a distal end of the shorting arm 120 of dual-band IFA structure 100. The 5 GHz tuner 206 can be coupled between the dual-band IFA structure 100 and the second grounding point 110.

Figure 3:
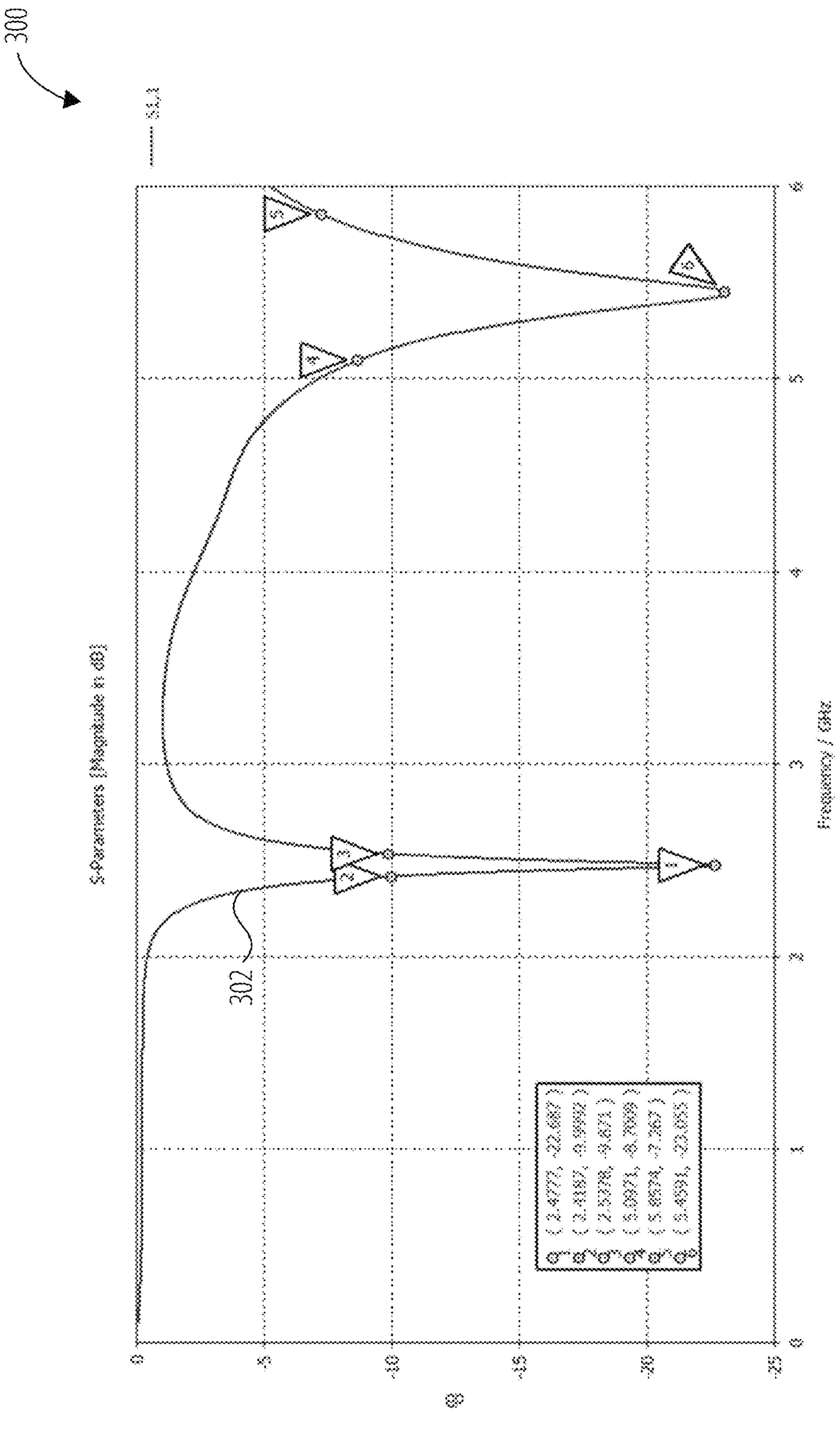
FIG. 3 is a graph illustrating a reflection coefficient of the dual-band IFA structure of FIG. 1A according to at least one embodiment.

FIG. 3 is a graph 300 illustrating a reflection coefficient 302 of the dual-band IFA structure of FIG. 1A according to at least one embodiment. The reflection coefficient 302 (also referred to as S-parameter) is below at least −4 dB in the 2.4 GHz frequency band and the 5 GHz frequency band. The S-parameters indicate the input-output relationship of the dual-band IFA structure 100 and are measured in decibels (dB). For example, S11 represents an amount of power reflected at the dual-band IFA structure 100. In one embodiment, the dual-band IFA structure 100 may cover two frequency ranges, including a first frequency range of approximately 2.2 GHz to approximately 2.7 GHz and a second frequency range of approximately 4.5 GHz to approximately 6.2 GHz.

Figure 4:
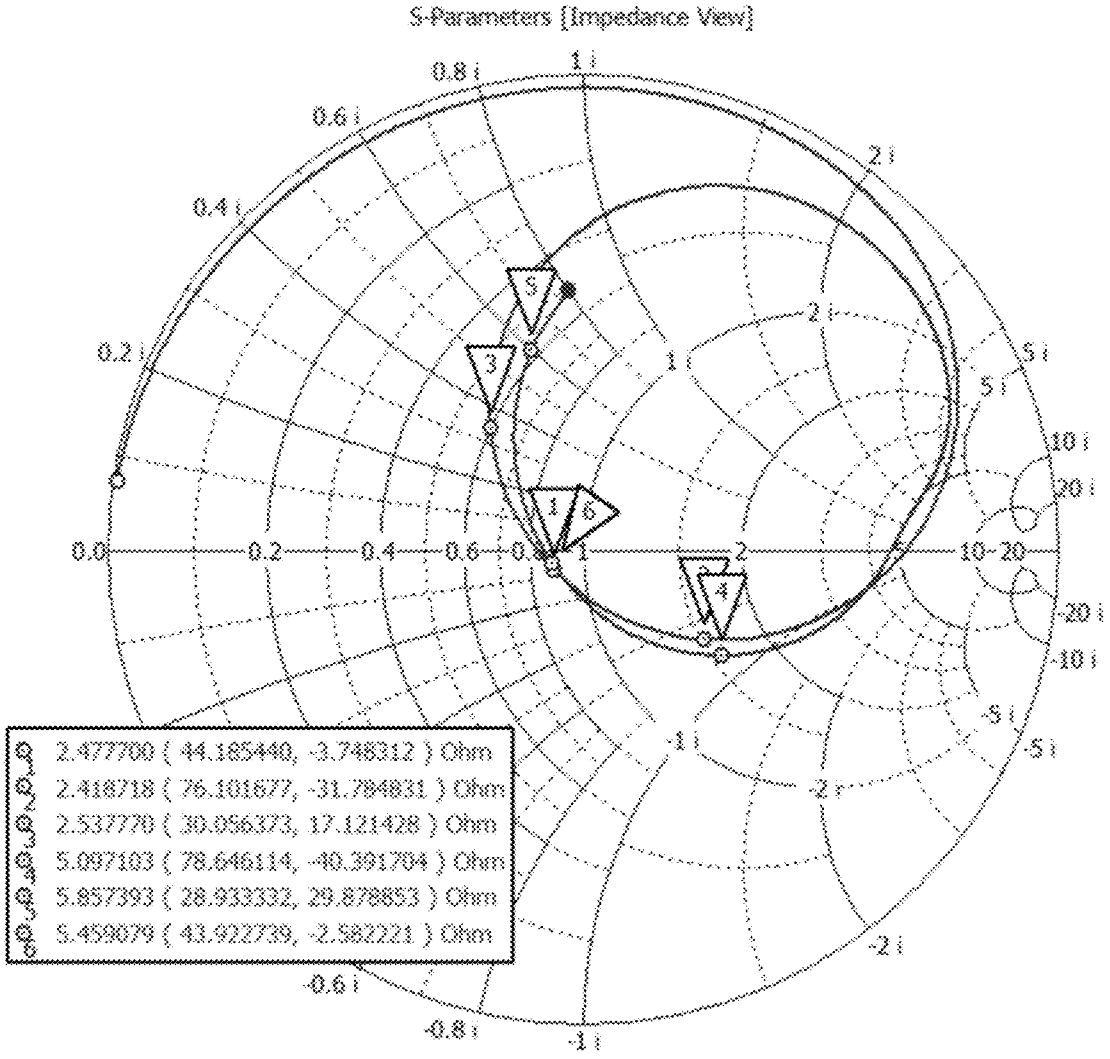
FIG. 4 is a Smith Chart of an input impedance of the dual-band IFA structure of FIG. 1A according to at least one embodiment.

FIG. 4 is a Smith Chart 400 of an input impedance of the dual-band IFA structure of FIG. 1A according to at least one embodiment. The Smith Chart 400 illustrates how the impedance and reactance behave at different frequencies for the dual-band IFA structure 100 tuned to the 2.4 GHz frequency band and the 5 GHz frequency band. The Smith Chart 400 illustrates the dual-band IFA structure 100 as having two resonant modes as the locus of antenna input impedance on the Smith Chart 400 as identified as two loops.

Figure 5:
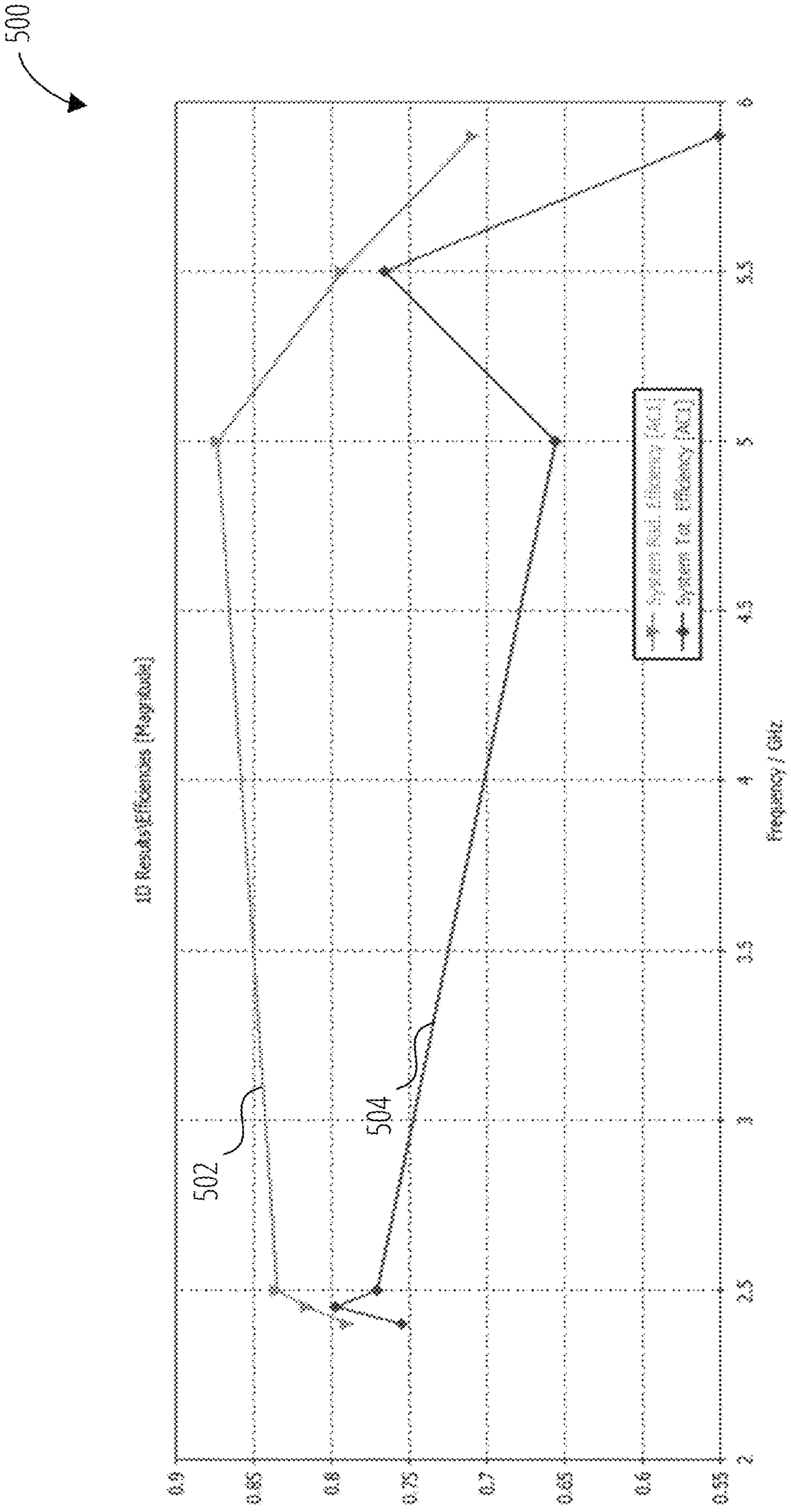
FIG. 5 is a graph illustrating the efficiency of the dual-band IFA structure of FIG. 1A in percentages, according to at least one embodiment.

FIG. 5 is a graph 500 illustrating the efficiency of the dual-band IFA structure of FIG. 1A in percentages, according to at least one embodiment. The graph 500 illustrates the radiation efficiency 502 and a total efficiency 504. The total efficiency of the dual-band IFA structure 100 can be measured by including the loss of the structure and mismatch loss. The graph 500 shows that the dual-band IFA structure 100 is a viable antenna for the 2.4 GHz frequency band and the 5 GHz frequency band. The graph 500 shows the efficiency of the dual-band IFA structure 100 in free space in percentages. The efficiency can be shown in dBs in FIG. 6.

Figure 6:
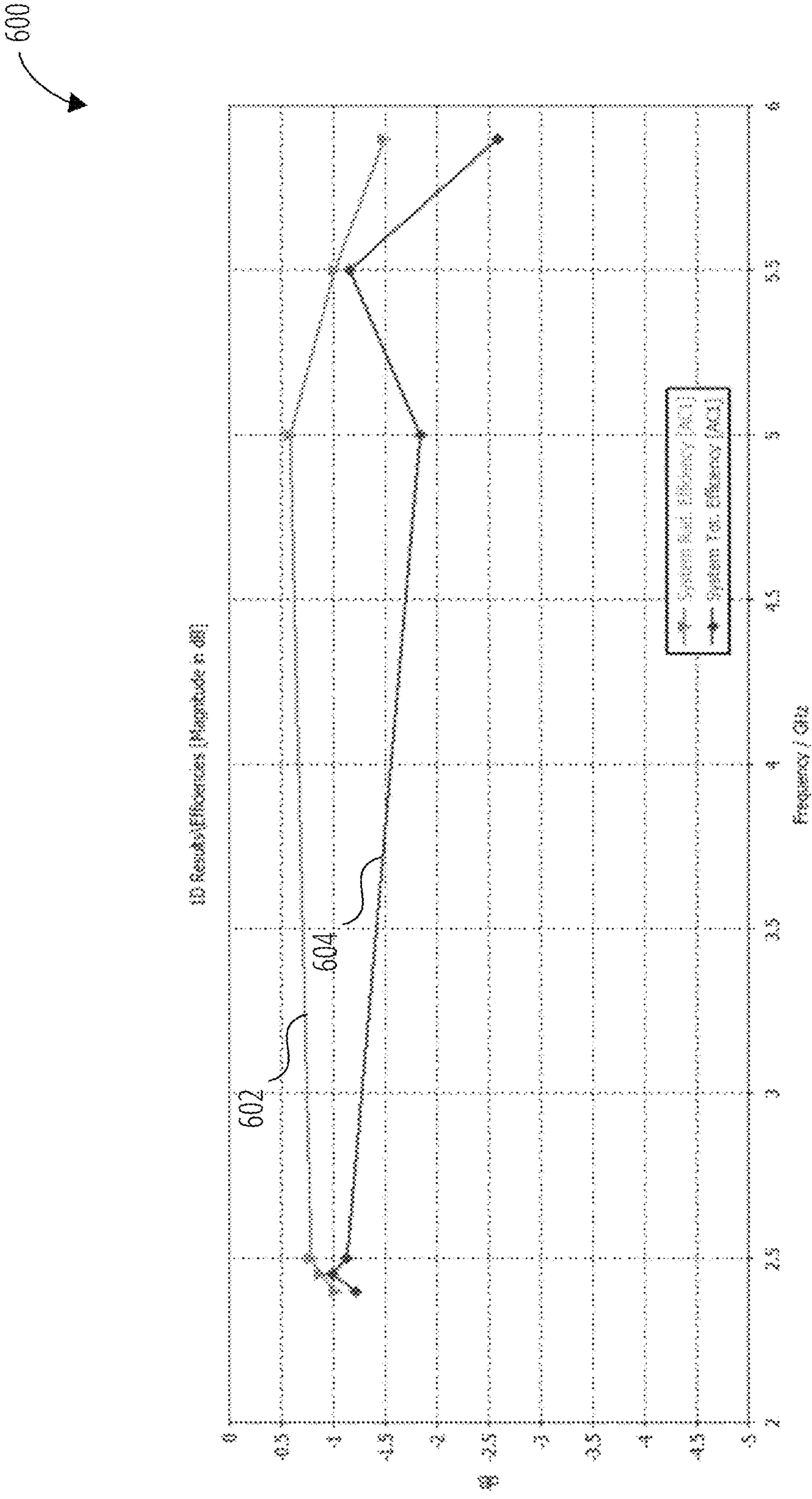
FIG. 6 is a graph illustrating the efficiency of the dual-band IFA structure of FIG. 1A in dB, according to at least one embodiment.

FIG. 6 is a graph illustrating the efficiency of the dual-band IFA structure of FIG. 1A in dB, according to at least one embodiment. The graph 600 shows the efficiency of the dual-band IFA structure 100 in free space in decibels (dB). The graph 600 illustrates the radiation efficiency 602 and a total efficiency 604. The total efficiency of the dual-band IFA structure 100 can be measured by including the loss of the structure and mismatch loss. The graph 600 shows that the dual-band IFA structure 100 is a viable antenna for the 2.4 GHz frequency band and the 5 GHz frequency band.

Figure 7:
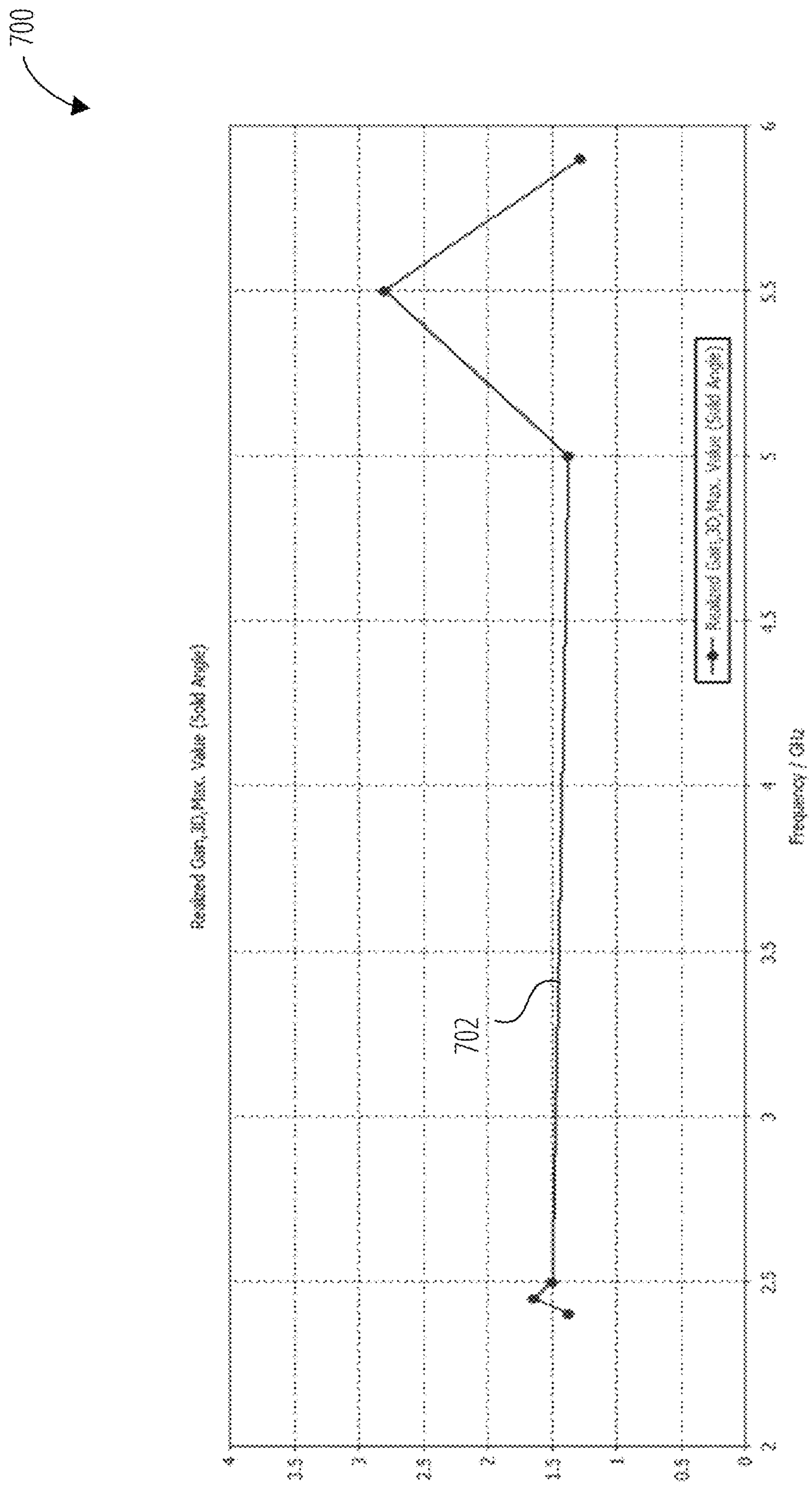
FIG. 7 is a graph illustrating a realized gain of the dual-band IFA structure of FIG. 1A according to at least one embodiment.

FIG. 7 is a graph 700 illustrating a realized gain 702 of the dual-band IFA structure of FIG. 1A according to at least one embodiment. The realized gain 702 can be determined by the input power to the dual-band IFA structure 100 and the radiated power of the dual-band IFA structure 100. The realized gain 702 can take into amount the reflection losses or mismatches. The losses can arise due to the difference in the antenna input and the matching impedance.

Figure 8A:
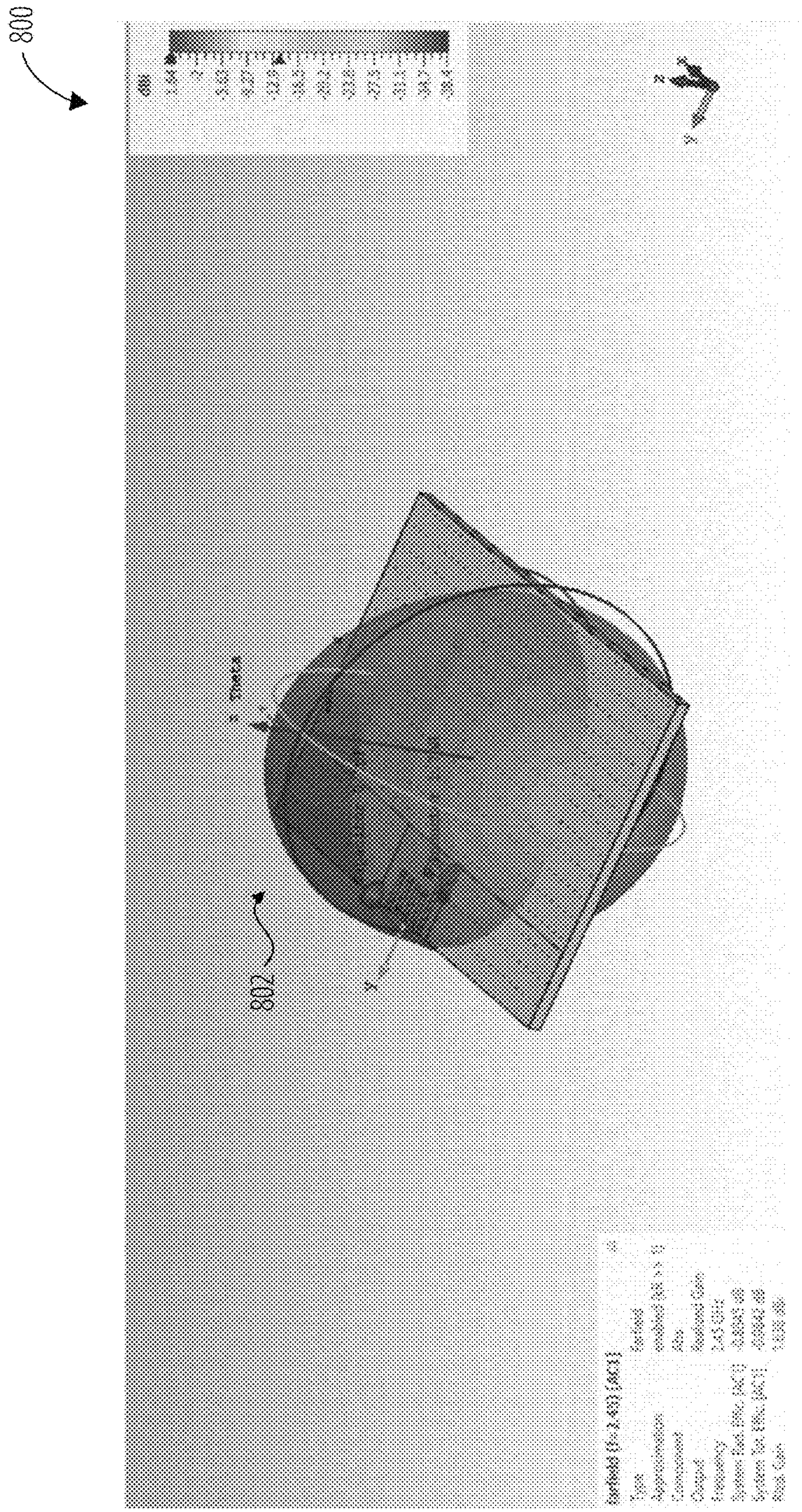
FIG. 8A is a graph illustrating a far-field of the dual-band IFA structure of FIG. 1A at the 2.45 GHz frequency band according to at least one embodiment.

FIG. 8A is a graph 800 illustrating a far-field radiation pattern 802 of the dual-band IFA structure of FIG. 1A at the 2.45 GHz frequency band according to at least one embodiment. The far-field radiation pattern 802 is a spherical or donut shape.

Figure 8B:
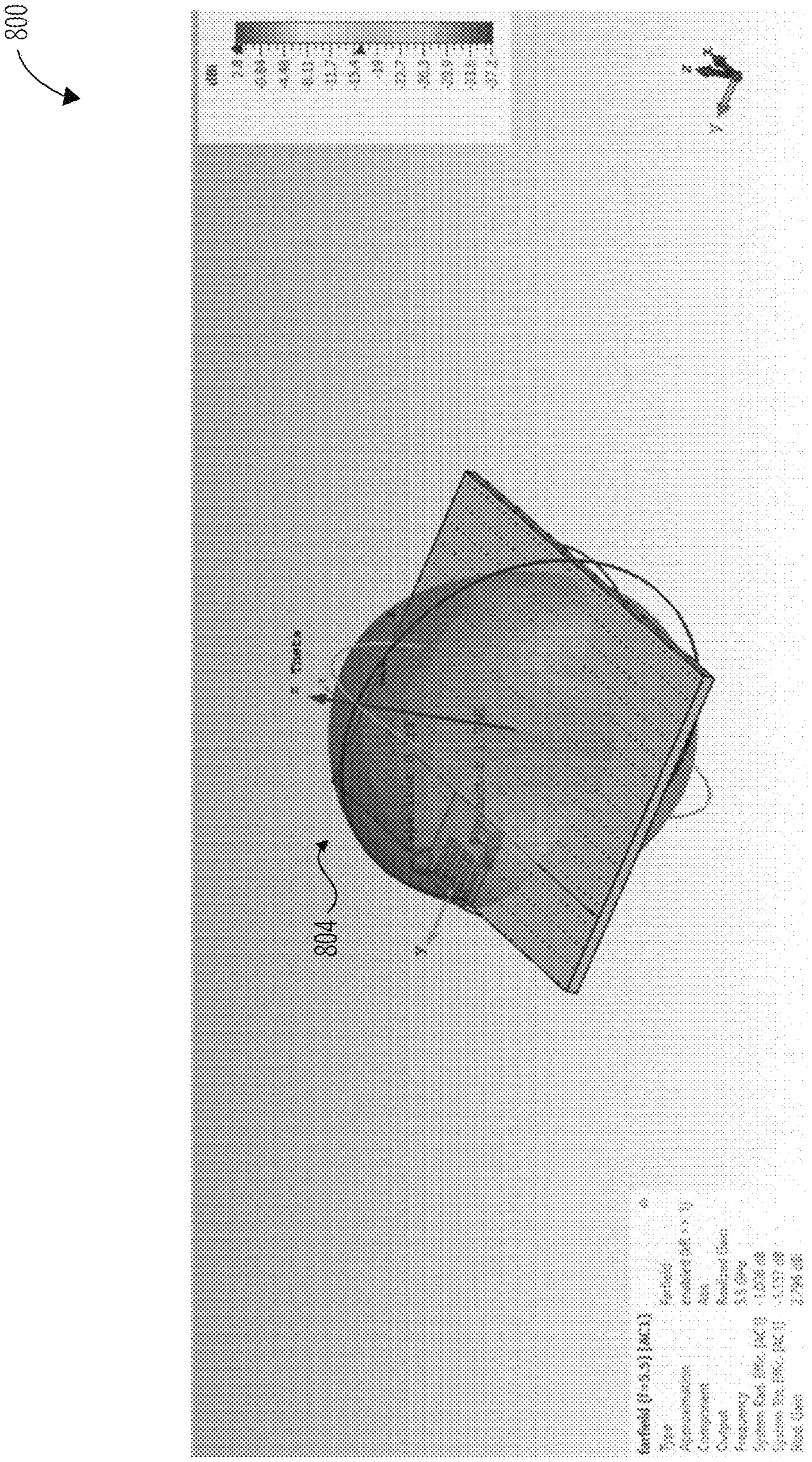
FIG. 8B is a graph illustrating a far-field of the dual-band IFA structure of FIG. 1A at the 5.5 GHz frequency band according to at least one embodiment.

FIG. 8B is a graph 800 illustrating a far-field radiation pattern 804 of the dual-band IFA structure of FIG. 1A at the 5 GHz frequency band according to at least one embodiment. The far-field radiation pattern 804 is a spherical or donut shape.

Figure 9A:
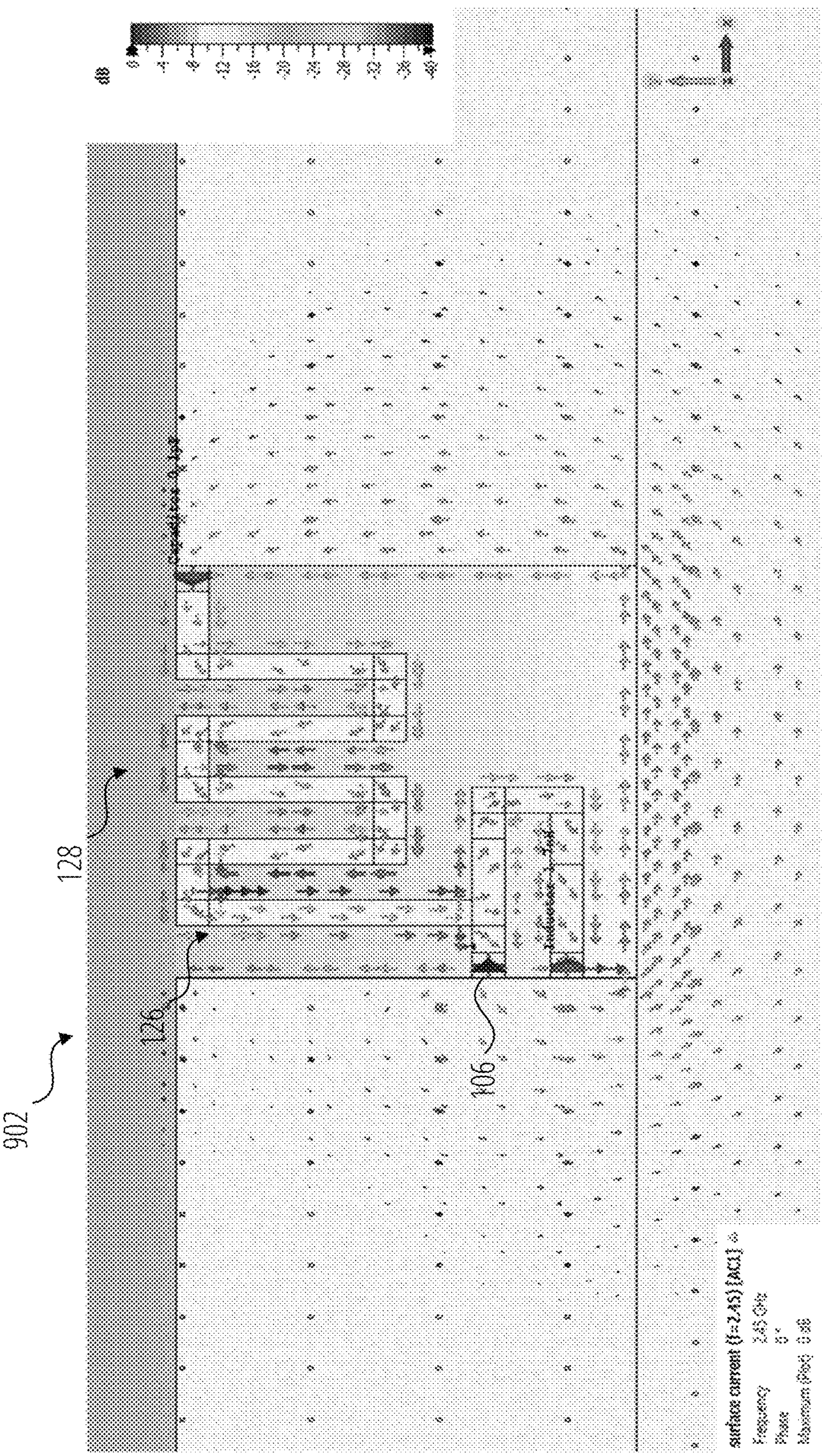
FIG. 9A illustrates a first pattern of surface currents of the dual-band IFA structure of FIG. 1A at the 2.45 GHz frequency band according to at least one embodiment.

FIG. 9A illustrates a first pattern 902 of surface currents of the dual-band IFA structure of FIG. 1A at the 2.4 GHz frequency band according to at least one embodiment. The surface currents of the first pattern 902 are generated as a result of the RF signals in the first frequency range (e.g., 2.4 GHz frequency band) being applied to an RF feed at the feed point 106. The surface currents of the first pattern 902 create one or more hot spots of magnetic fields at the feed point 106, along the first portion 126 of the conductive trace, and along the second portion 128 of the conductive trace.

Figure 9B:
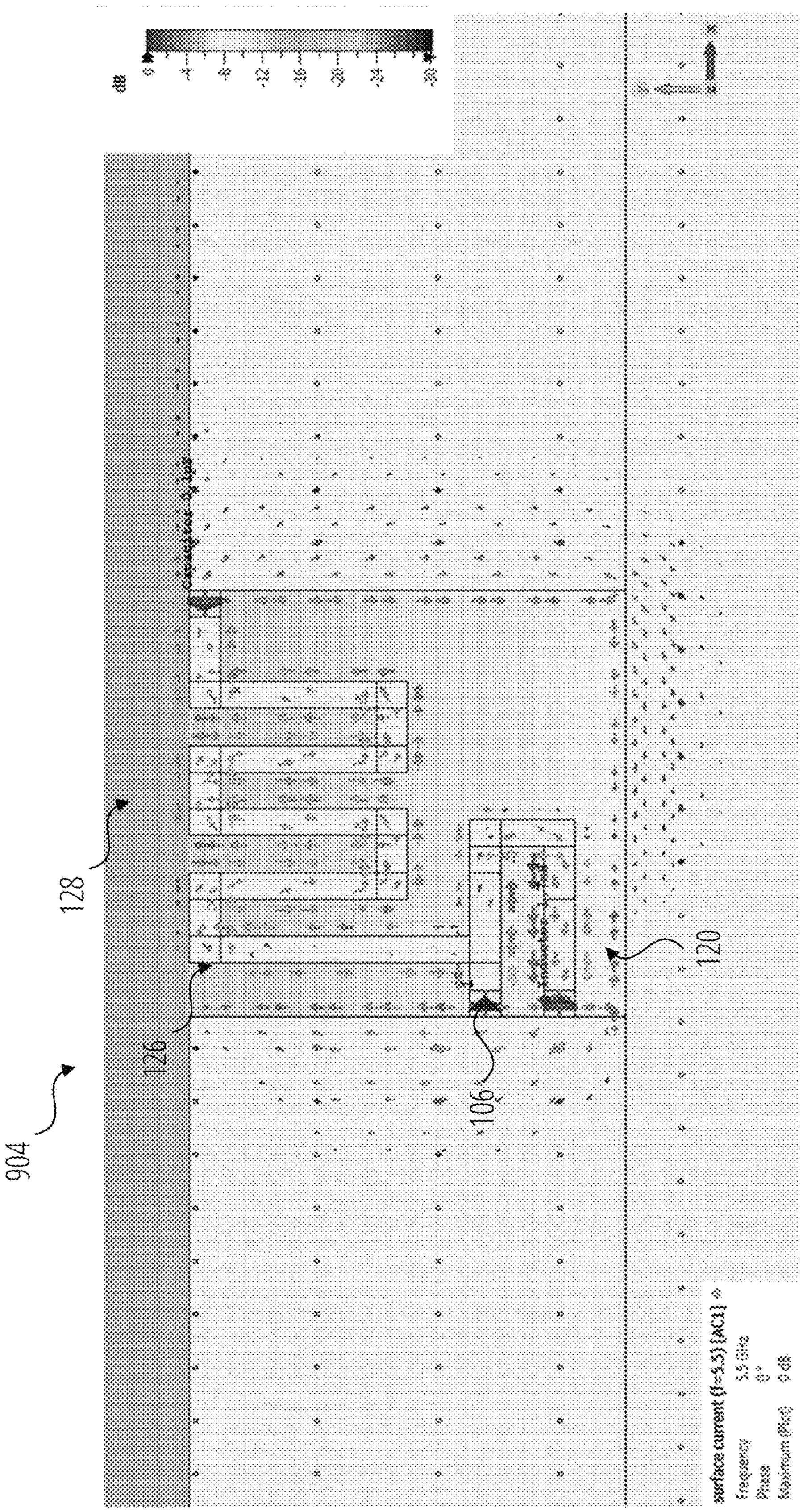
FIG. 9B illustrates a second pattern of surface currents of the dual-band IFA structure of FIG. 1A at the 5.5 GHz frequency band according to at least one embodiment.

FIG. 9B illustrates a second pattern 904 of surface currents of the dual-band IFA structure of FIG. 1A at the 5 GHz frequency band according to at least one embodiment. The surface currents of the second pattern 904 are generated as a result of the RF signals in the second frequency range (e.g., 5 GHz frequency band) being applied to an RF feed at the feed point 106. The surface currents of the second pattern 904 create one or more hot spots of magnetic fields at the feed point 106 and the shorting arm 120.

Figure 10A:
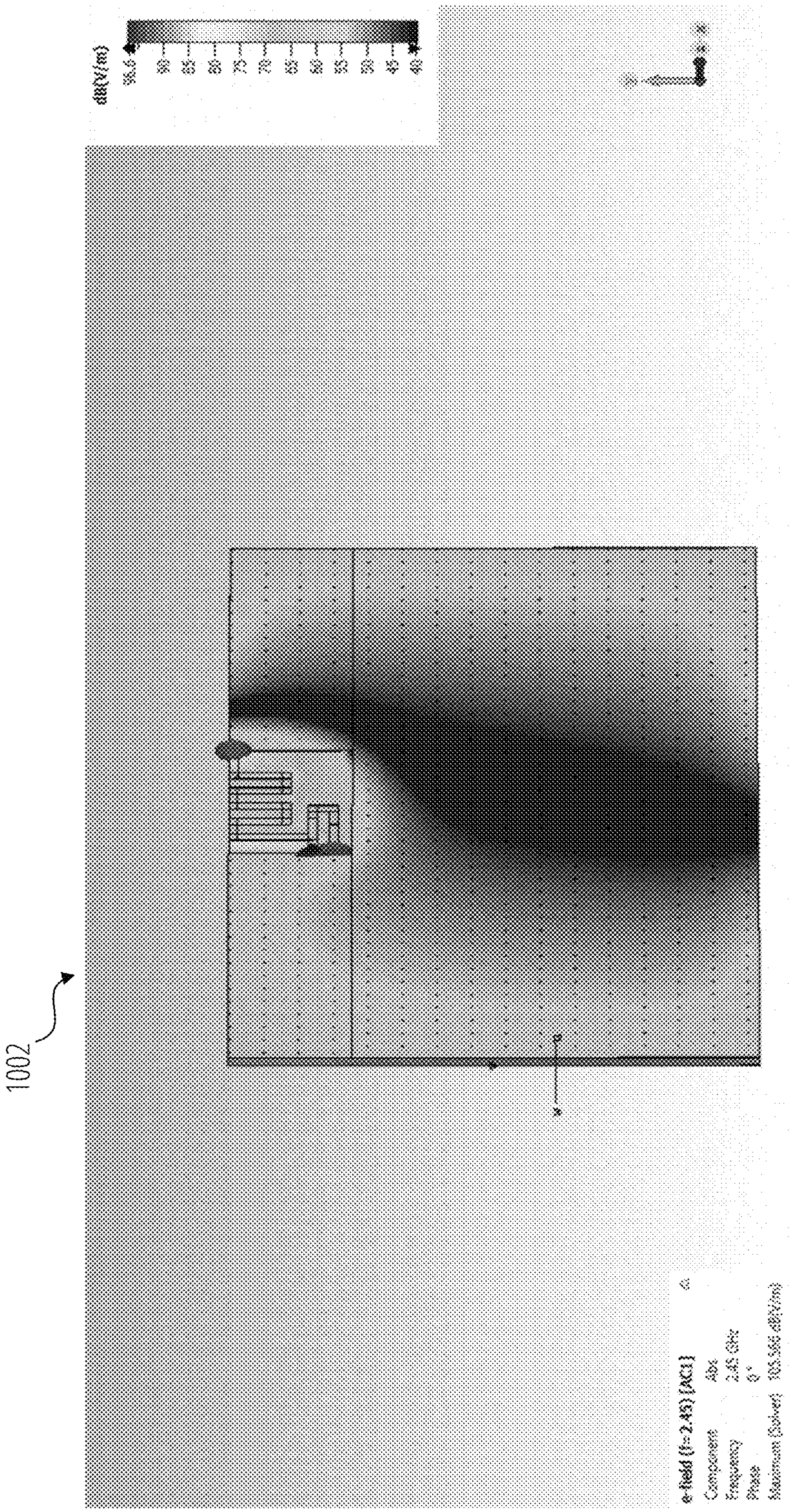
FIG. 10A illustrates an e-field of the dual-band IFA structure of FIG. 1A at the 2.45 GHz frequency band according to at least one embodiment.

FIG. 10A illustrates an e-field 1002 of the dual-band IFA structure 100 of FIG. 1A at the 2.4 GHz frequency band according to at least one embodiment. The e-field 1002 is the electric field of the electromagnetic energy radiated by the dual-band IFA structure 100 as a result of the RF signals in the first frequency range (e.g., 2.4 GHz frequency band) being applied to an RF feed at the feed point 106. The e-field 1002 is after the impedance-matching at 2.45 GHz.

Figure 10B:
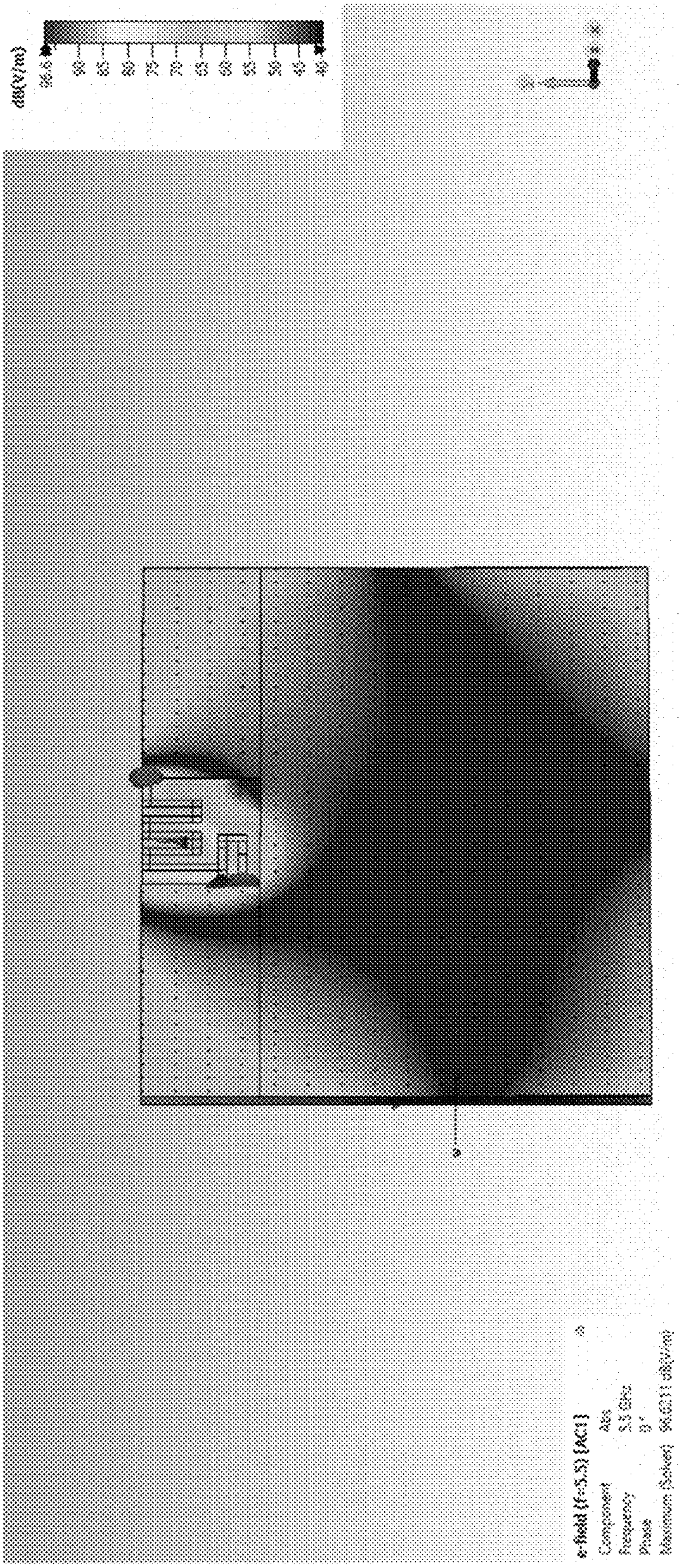
FIG. 10B illustrates an e-field of the dual-band IFA structure of FIG. 1A at the 5.5 GHz frequency band according to at least one embodiment.

FIG. 10B illustrates an e-field 1004 of the dual-band IFA structure 100 of FIG. 1A at the 5 GHz frequency band according to at least one embodiment. The e-field 1004 is the electric field of the electromagnetic energy radiated by the dual-band IFA structure 100 as a result of the RF signals in the second frequency range (e.g., 5 GHz frequency band) being applied to an RF feed at the feed point 106. The e-field 1004 is after the impedance-matching at 5.5 GHz.

Figure 11A:
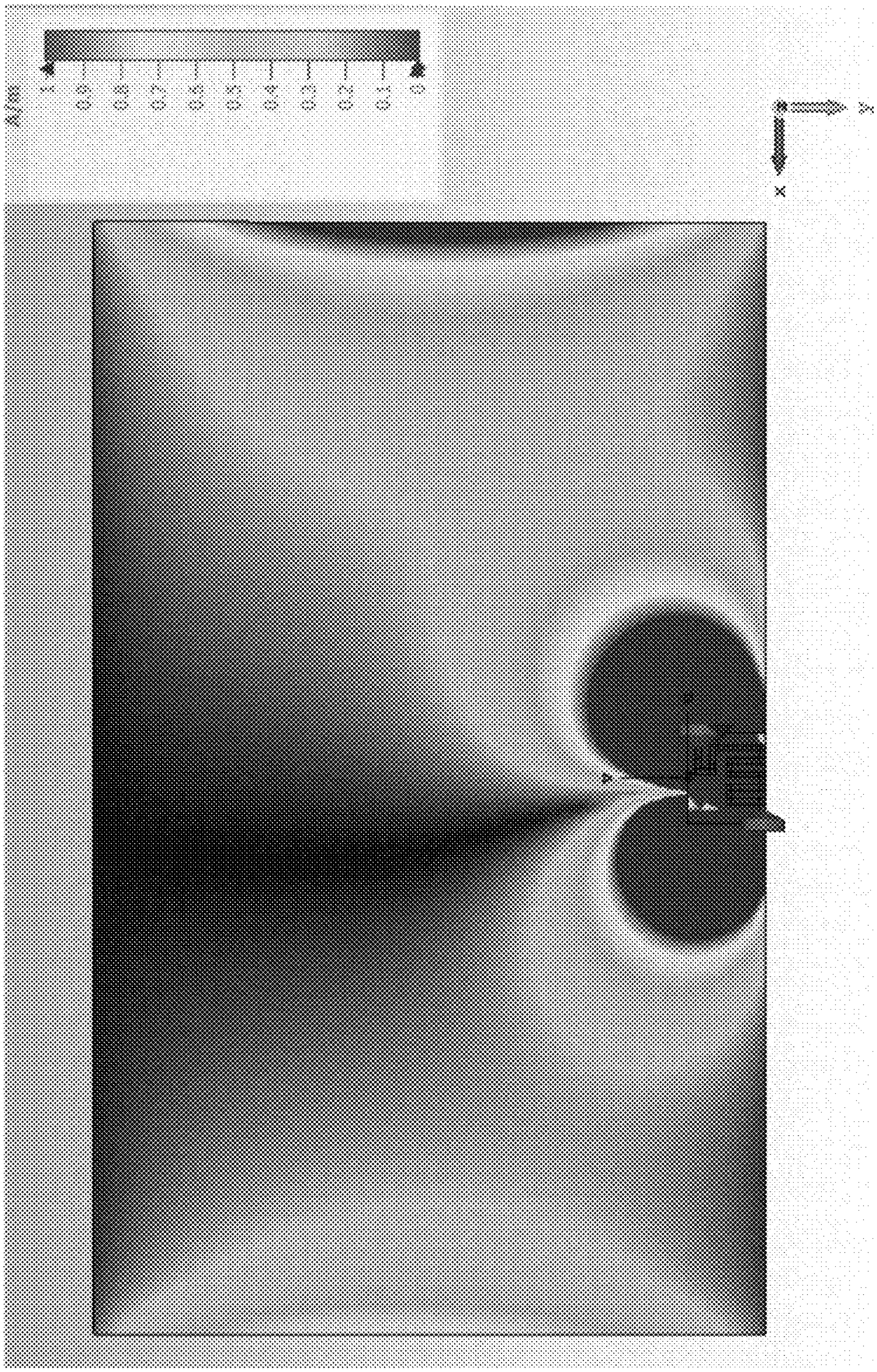
FIG. 11A illustrates an h-field in x-direction (Hx component) of the dual-band IFA structure of FIG. 1A at the 2.45 GHz frequency band according to at least one embodiment.

FIG. 11A illustrates an h-field in x-direction (Hx component) 1102 of the dual-band IFA structure 100 of FIG. 1A at the 2.45 GHz frequency band according to at least one embodiment. The Hx component 1102 is the magnetic field of the electromagnetic energy radiated by the dual-band IFA structure 100 in the x-dimension as a result of the RF signals being applied to an RF feed at the feed point 106. The Hx component 1102 is the Hx component on a bare PCB.

Figure 11B:
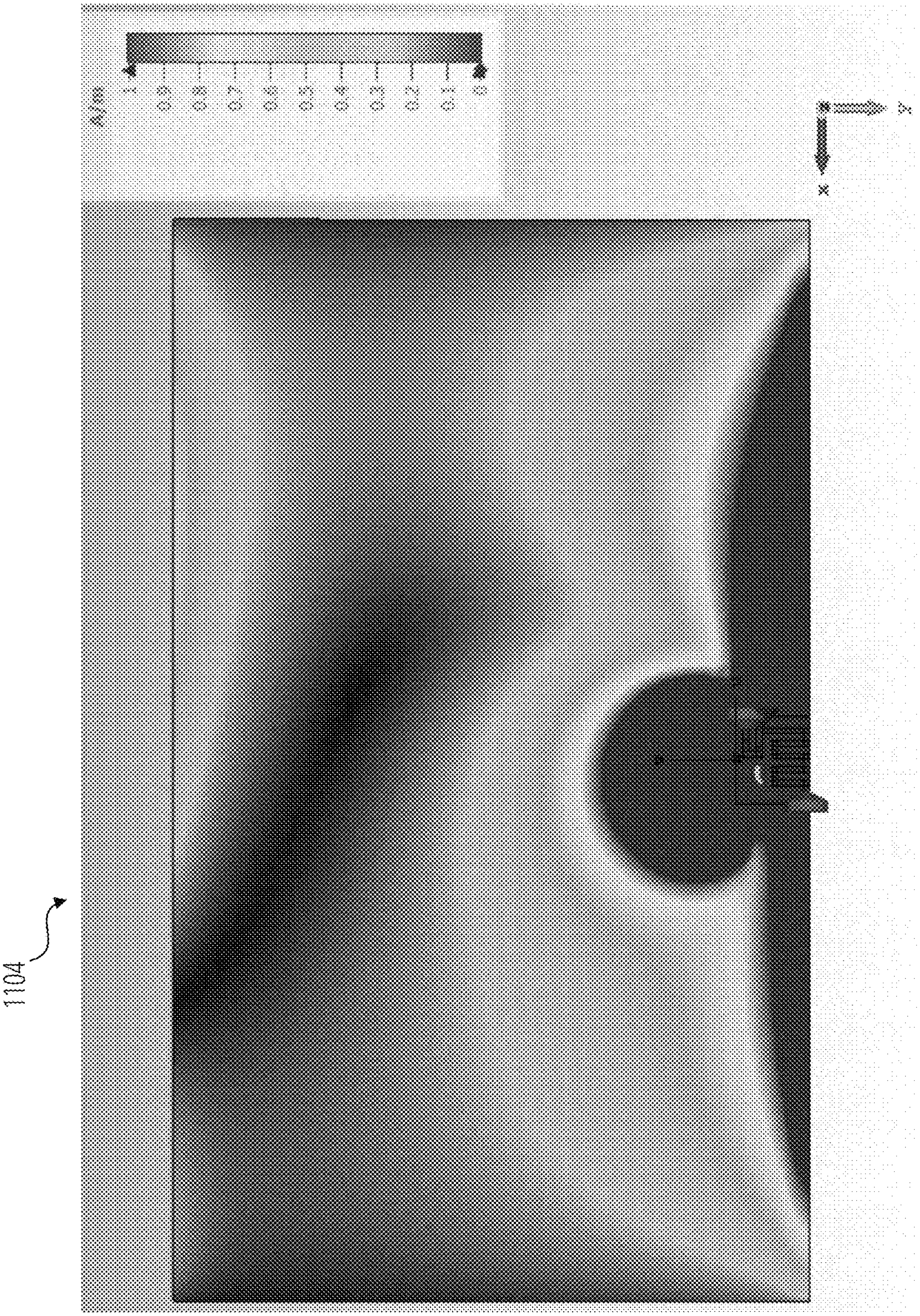
FIG. 11B illustrates an h-field in y-direction (Hy component) of the dual-band IFA structure of FIG. 1A at the 2.45 GHz frequency band according to at least one embodiment.

FIG. 11B illustrates an h-field in y-direction (Hy component) 1104 of the dual-band IFA structure 100 of FIG. 1A at the 2.45 GHz frequency band according to at least one embodiment. The Hy component 1104 is the magnetic field of the electromagnetic energy radiated by the dual-band IFA structure 100 in the y-dimension as a result of the RF signals being applied to an RF feed at the feed point 106. The Hy component 1104 is the Hy component on a bare PCB.

As described above, the surface currents on the PCB can be small, but a conductive fastener can be coupled between the PCB and a metal structure. The conductive fastener can divert the surface currents from the ground plane to the metal structure. In at least one embodiment, the conductive fastener is a conductive spring clip coupled between a PCB and a heatsink, as illustrated in FIG. 12.

FIG. 12 illustrates a wireless device 1200 with a conductive spring clip 1206 coupled between a heatsink 1208 and a PCB 1204 with a dual-band IFA structure 1202 according to at least one embodiment. The dual-band IFA structure 1202 is similar to the dual-band IFA structure 100 of FIG. 1A. The PCB 1204 has a ground plane with an opening in which the dual-band IFA structure 1202 is located. The conductive spring clip 1206 couples the PCB 1204 to the heatsink 1208. The heatsink 1208 can be disposed above other active circuitry on the PCB 1204 (not illustrated in FIG. 12). The active circuitry can be located in a region under the heatsink 1208. The active circuitry can be one or more chips disposed on the PCB 1204. Any surface currents on the PCB 1204, caused by the dual-band IFA structure 1202, can be diverted to the heatsink 1208 by the conductive spring clip 1206. Additional spring clips can secure the heatsink 1208 or other metal structures to the PCB 1204. Diverting the surface currents can minimize noise coupling from the active circuitry to the dual-band IFA structure 1202. This adds to the noise immunity of the dual-band IFA structure 1202. Also, as described above, the physical design of the dual-band IFA structure 1202 also contributes to minimizing noise coupling between the dual-band IFA structure 1202 and other circuitry on the PCB 1204. The noise immunity of the dual-band IFA structure 1202 is shown in the following radiation footprints of the dual-band IFA structure 1202 in FIG. 13A and FIG. 13B.

Figure 13A:
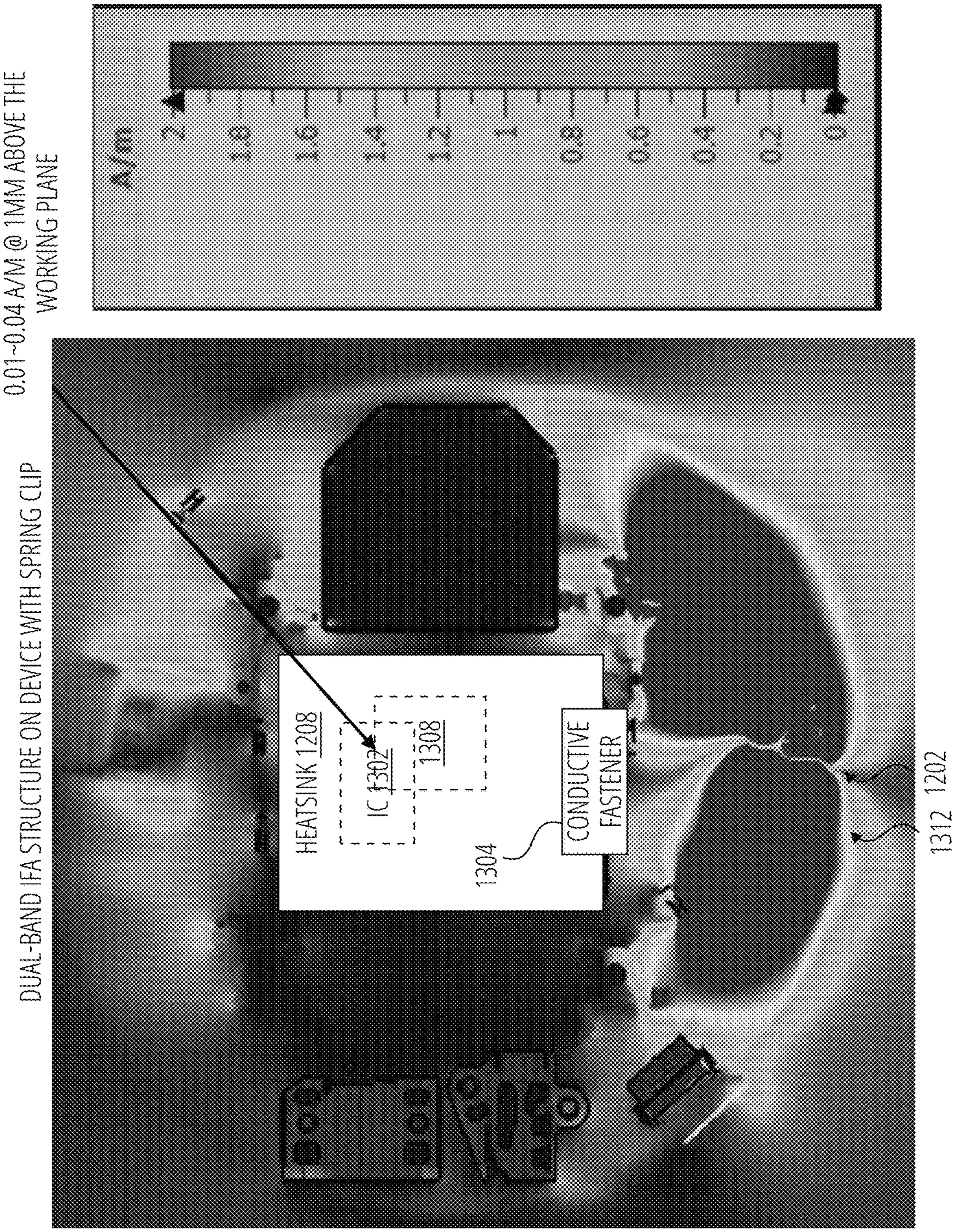
FIG. 13A illustrates a radiation footprint at the 2.45 GHz frequency of a dual-band IFA structure of a PCB coupled to a metal structure with a spring clip according to at least one embodiment.

FIG. 13A illustrates a radiation footprint 1312 of a dual-band IFA structure 1202 of a PCB 1204 coupled to a heatsink 1208 with a conductive fastener 1304 according to at least one embodiment. As described above, active circuitry can be located in a region under the heatsink 1208. In this embodiment, an integrated circuit (IC) 1302 is located under the heatsink 1208. The heatsink 1208 is coupled to the PCB 1204 using a conductive fastener 1304. The conductive fastener 1304 can be one or more spring clips. The dual-band IFA structure 1202 generates a radiation footprint 1312 in a first region. Any surface currents caused by the dual-band IFA structure 1202 are diverted to the heatsink 1208 through the conductive fastener 1304. The radiation footprint 1312 can result in a small energy (e.g., approximately 0.01~0.04 A/m) at 1 mm above a working plane 1308.

Figure 13B:
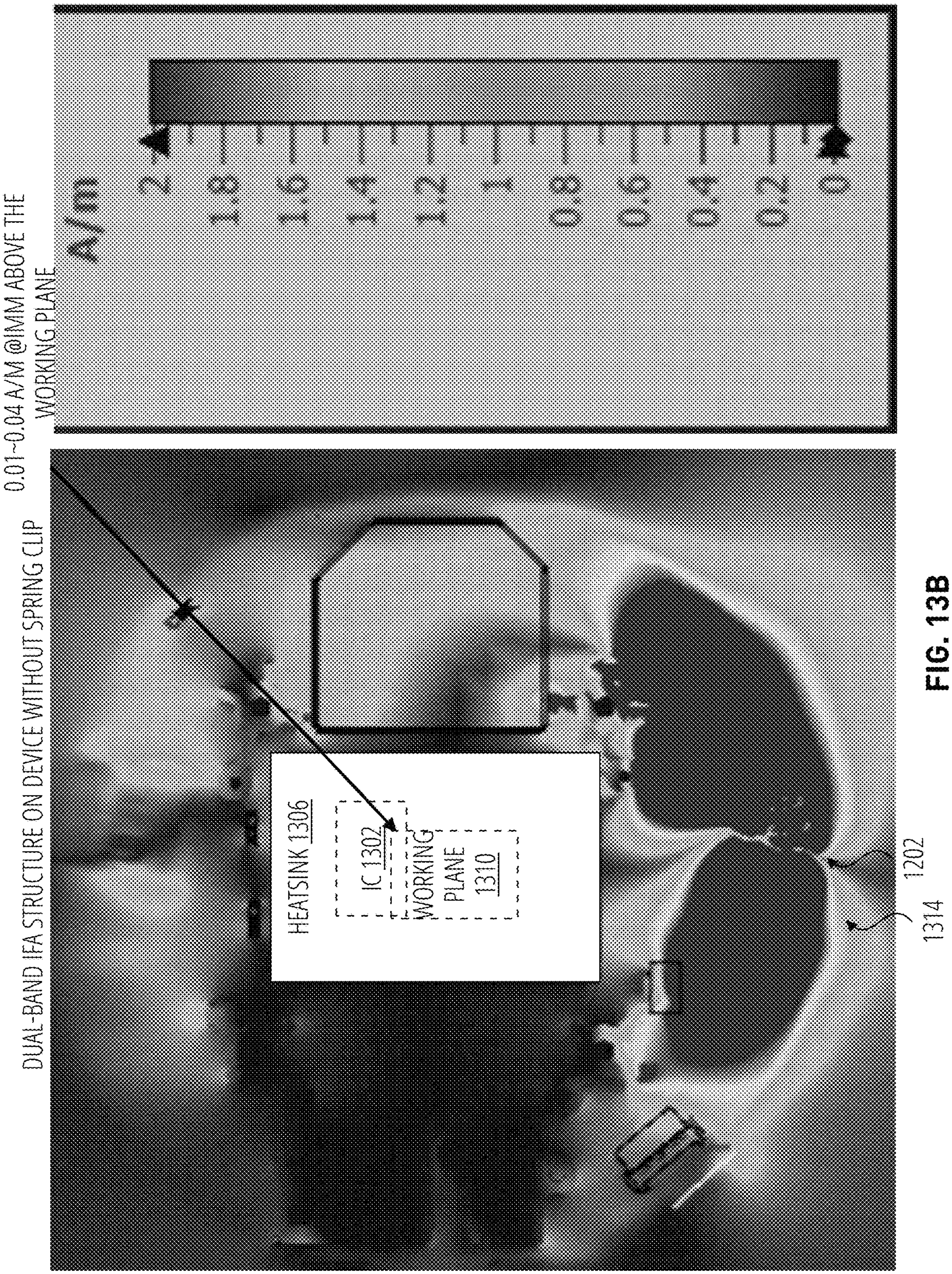
FIG. 13B illustrates a radiation footprint at the 2.45 GHz frequency of a dual-band IFA structure of a PCB without a spring clip coupled between the PCB and the metal structure according to at least one embodiment.

FIG. 13B illustrates a radiation footprint 1314 of a dual-band IFA structure 1202 of a PCB 1204 without a conductive fastener coupled between the PCB and the metal structure according to at least one embodiment. The dual-band IFA structure 1202 generates a radiation footprint 1314 in a first region. Even though surface currents are not diverted to the heatsink 1208 through a conductive fastener, the radiation footprint 1314 can result in a small energy (e.g., approximately 0.01~0.04 A/m) at 1 mm above a working plane 1310.

As illustrated in FIG. 13A and FIG. 13B, the dual-band IFA structure 1202, by design, has a high current path along the left and right directions of the dual-band IFA structure 1202 and is not behind in the region of the IC 1302. The currents right behind the dual-band IFA structure 1202 are weaker, which makes the dual-band IFA structure 1202 immune to any aggressors located behind the radiation footprints 1312 and 1314. Thus, radiation footprints 1312 and 1314 of the dual-band IFA structure 1202 make the antenna a Noise Immune Antenna (NIMA).

Figure 14:
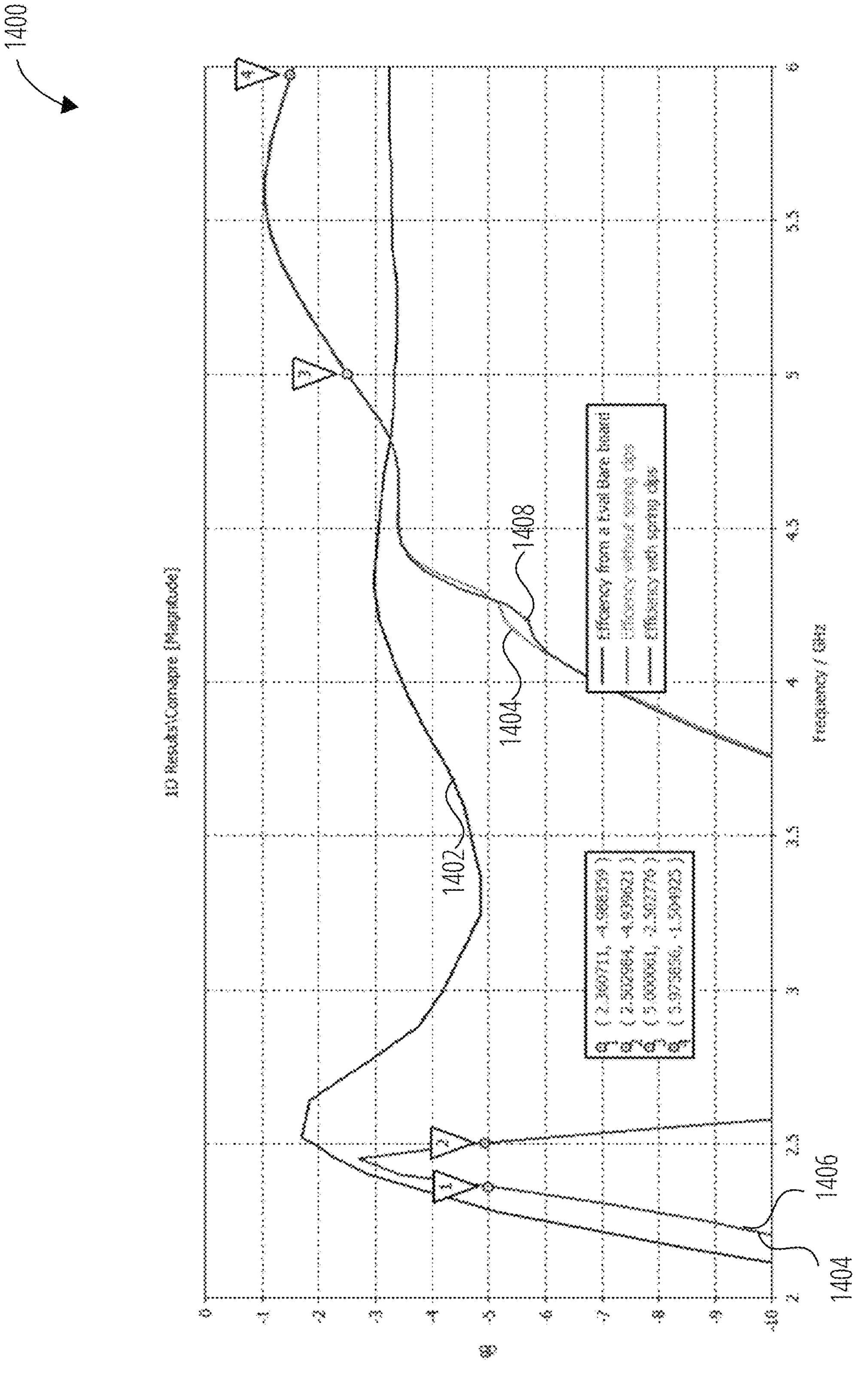
FIG. 14 is a graph illustrating the efficiency of the dual-band IFA structure of FIG. 12 with a bare board, with a spring clip, and without a spring clip according to various embodiments.

FIG. 14 is a graph 1400 illustrating the efficiency of the dual-band IFA structure of FIG. 12 with a bare board, with a spring clip, and without a spring clip according to various embodiments. The graph 1400 shows the efficiency 1402 of the dual-band IFA structure 100 on a bare PCB. The graph 1400 shows the efficiency 1404 of the dual-band IFA structure 100 on a PCB without spring clips. The graph 1400 shows the efficiency 1406 of the dual-band IFA structure 100 on a PCB without spring clips. The graph 1400 shows that the dual-band IFA structure 100 is a viable antenna for the 2.4 GHz frequency band and the 5 GHz frequency band.

The dual-band IFA structure 100 and dual-band IFA structure 1202 described above have a similar structure in the radiating arm, the shorting arm, and the feed arm. In other embodiments, the IFA structure can be modified for other dual-band antennas and single-band antennas, as illustrated and described below with respect to FIG. 15 to FIG. 22. These designs are considered to have the same antenna footprint as the referenced above, with some having open ends, shorted ends, tuning components at the ends, and other combinations.

Figure 15:
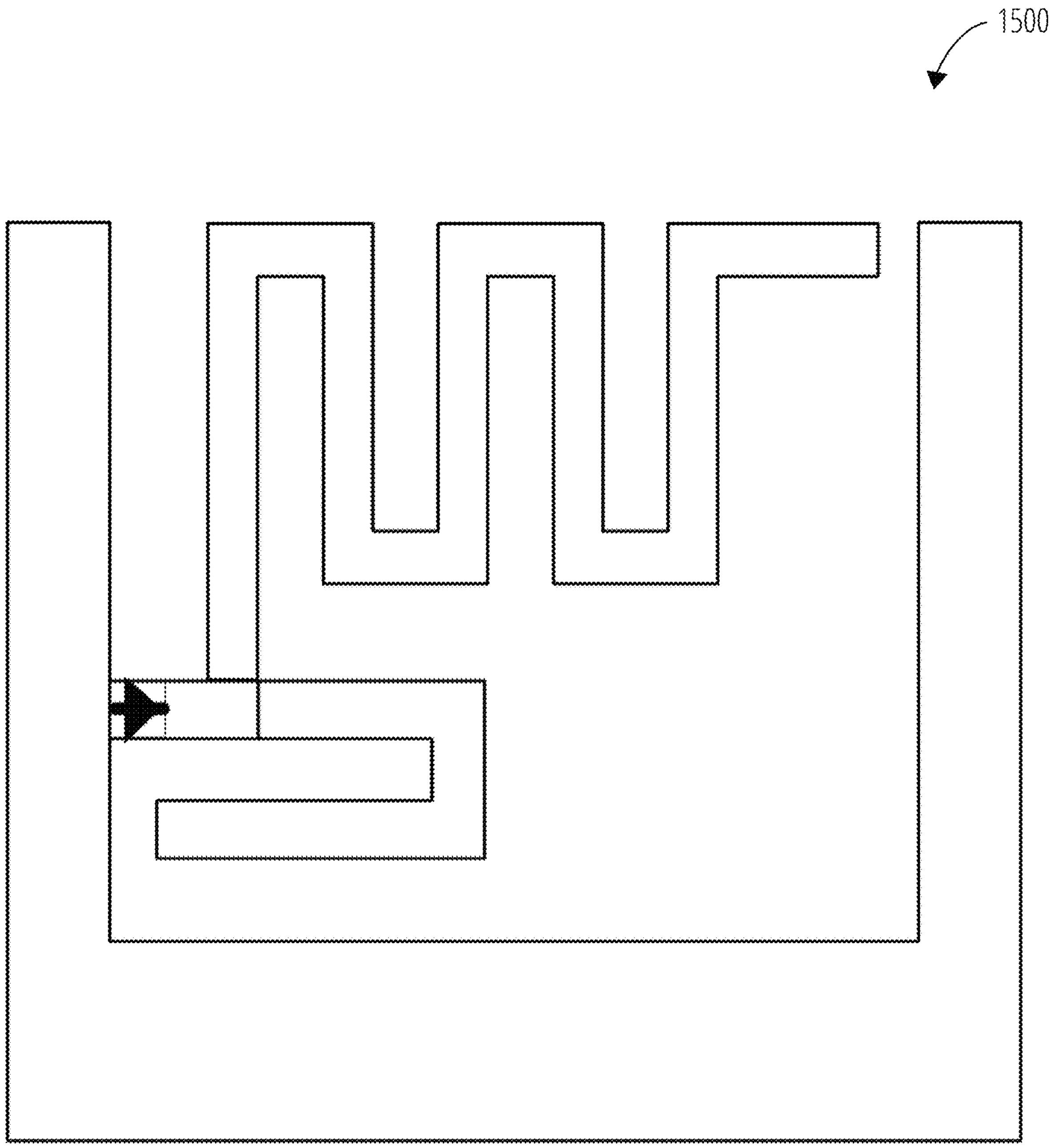
FIG. 15 illustrates a dual-band IFA structure with no tuning components according to at least one embodiment.

FIG. 15 illustrates a dual-band IFA structure 1500 with no tuning components according to at least one embodiment. In this embodiment, a first conductive arm (e.g., longer trace) is open at a distal end, and a shorting arm (e.g., shorter trace) is open at a distal end. The are no matching or tuning components at the trace ends. In at least one embodiment, a shunt component on the feed line can operate in an IFA mode but has a narrow band at 5.5 GHz (shorter trace) when tuned with an impedance-matching circuit before the feed point.

Figure 16:
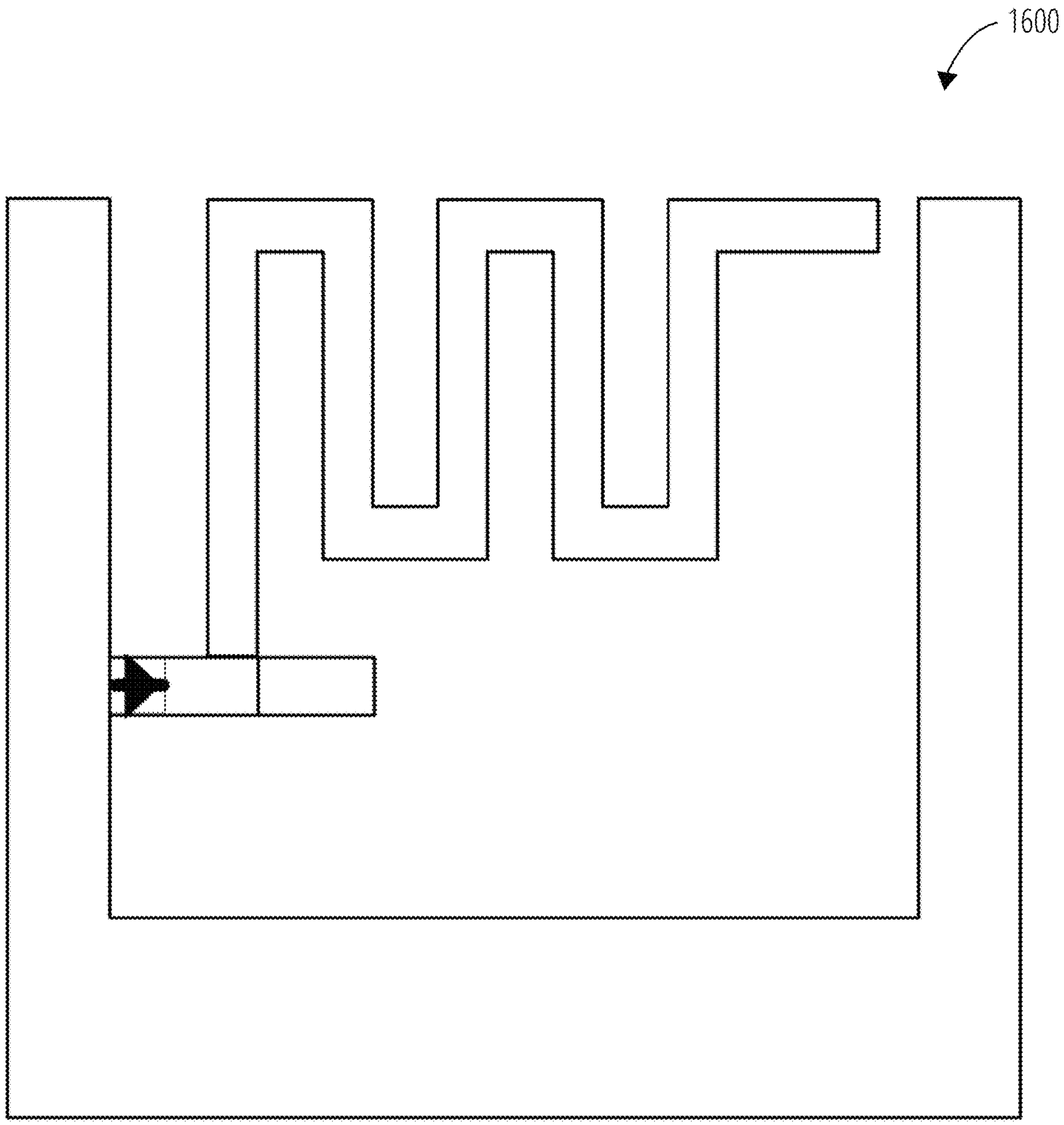
FIG. 16 illustrates a dual-band antenna with a monopole mode and no tuning components according to at least one embodiment.

FIG. 16 illustrates a dual-band antenna 1600 with a monopole mode and no tuning components according to at least one embodiment. In this embodiment, a first conductive trace (e.g., long trace) is open at a distal end and operates as a monopole type.

Figure 17:
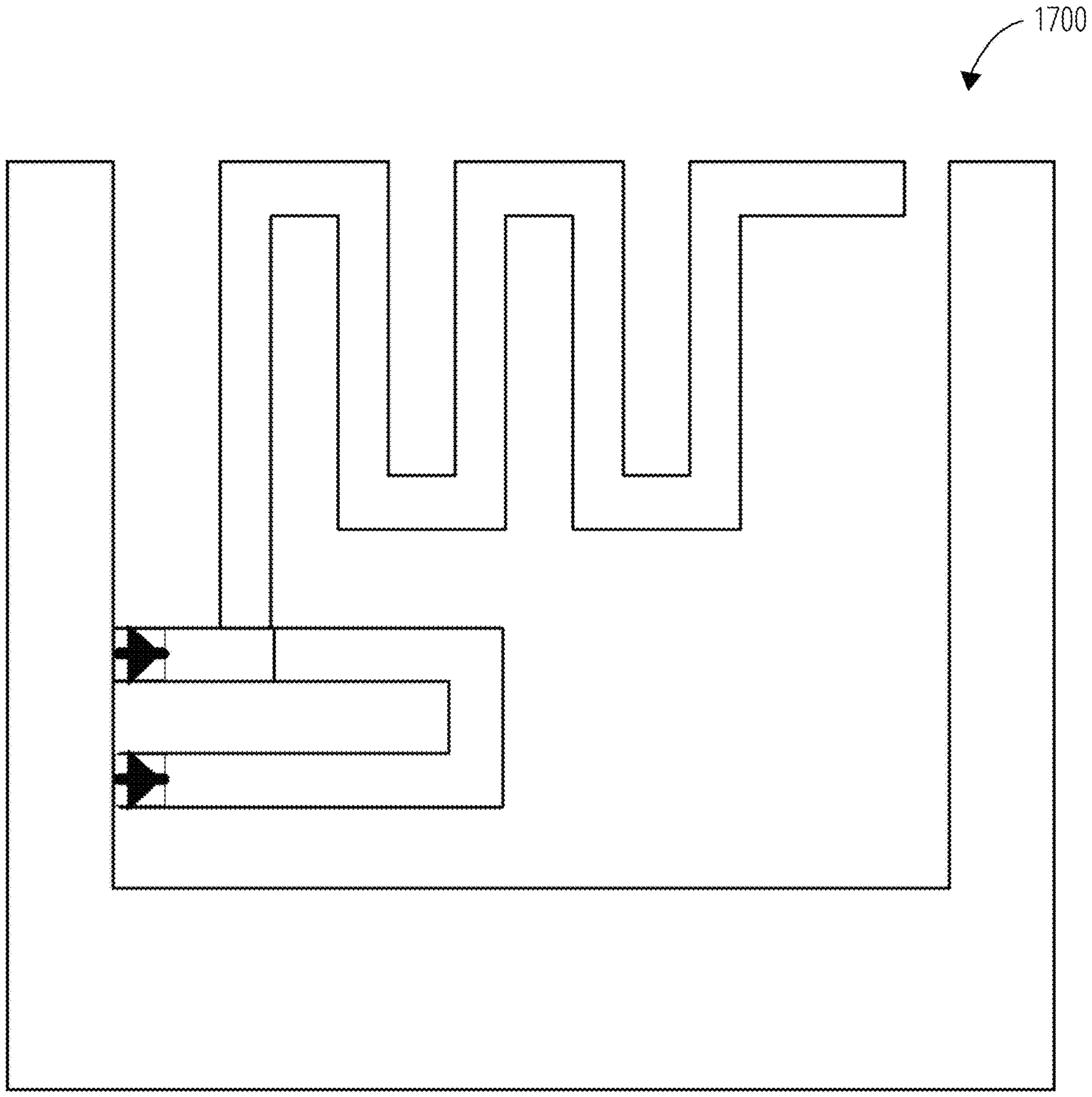
FIG. 17 illustrates a dual-band antenna with a tuning component on a shorting arm according to at least one embodiment.

FIG. 17 illustrates a dual-band IFA structure 1700 with a tuning component on a shorting arm according to at least one embodiment. In this embodiment, a first conductive arm (e.g., longer trace) is open at a distal end, and a shorting arm (e.g., shorter trace) is shorted at a distal end with a tuning component. The is no matching or tuning component at the trace end of the first conductive trace. In at least one embodiment, the tuning component includes at least an inductor.

The antenna structures of FIG. 15, FIG. 16, and FIG. 17 are dual-band WLAN antennas. The design can have the same antenna footprint described above, with open and short ends at the longer and shorter traces. The longer and shorter traces can be tunable for the 2.4 GHz and 5 GHz frequency bands, both resonances work in IFA mode.

Figure 18:
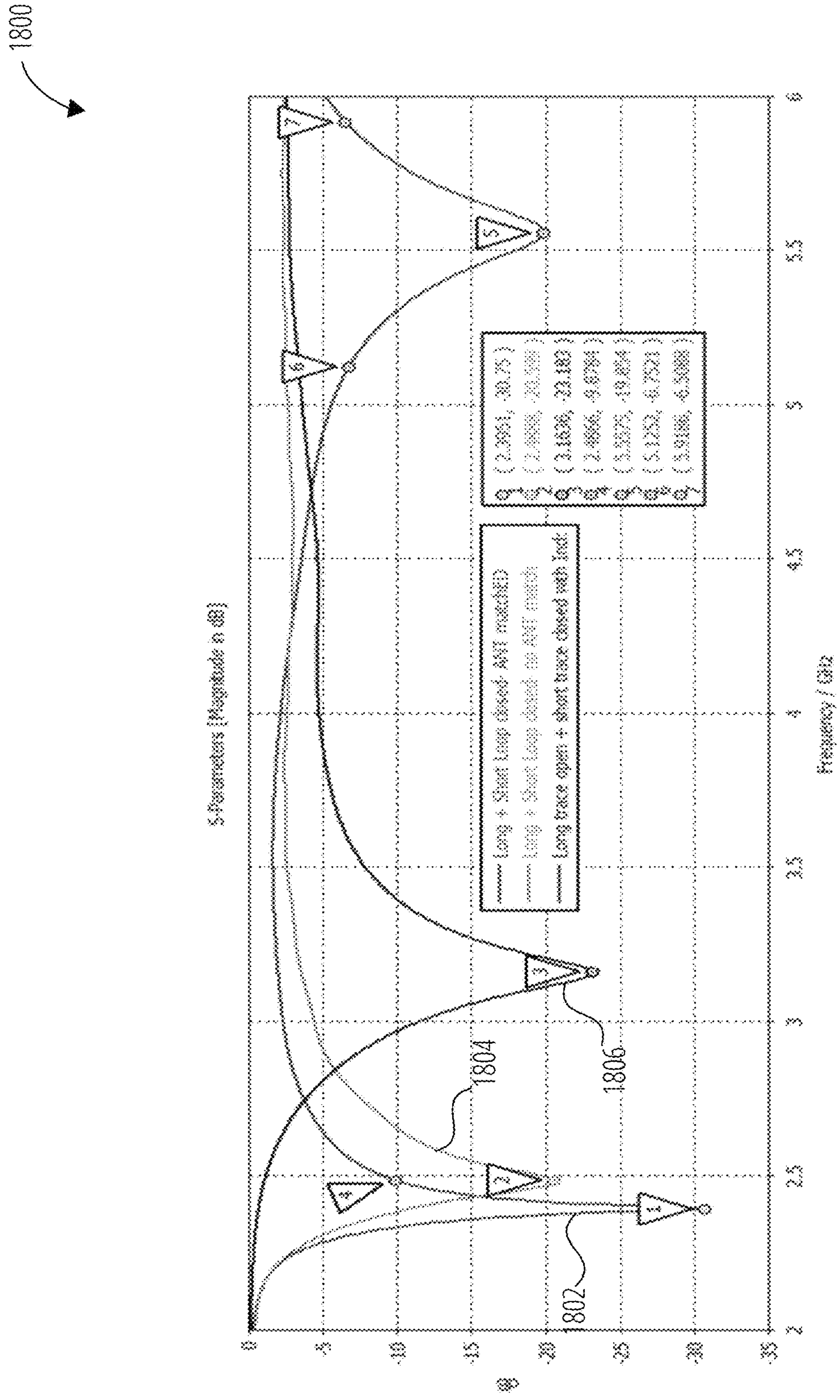
FIG. 18 is a graph illustrating the reflection coefficients of the antennas of FIG. 15, FIG. 16, and FIG. 17 according to at least one embodiment.

FIG. 18 is a graph 1800 illustrating the reflection coefficients of the antennas with dual arms closed with the ground plane according to at least one embodiment. Graph 1800 shows the reflection coefficient 1802 of a dual-band IFA structure with closed ends and impedance matched. Graph 1800 shows the reflection coefficient 1804 of a dual-band IFA structure with closed ends and not impedance matched. Graph 1800 shows the reflection coefficient 1806 of a dual-band IFA structure with a longer trace open and a shorter trace grounded with an inductor.

Figure 19:
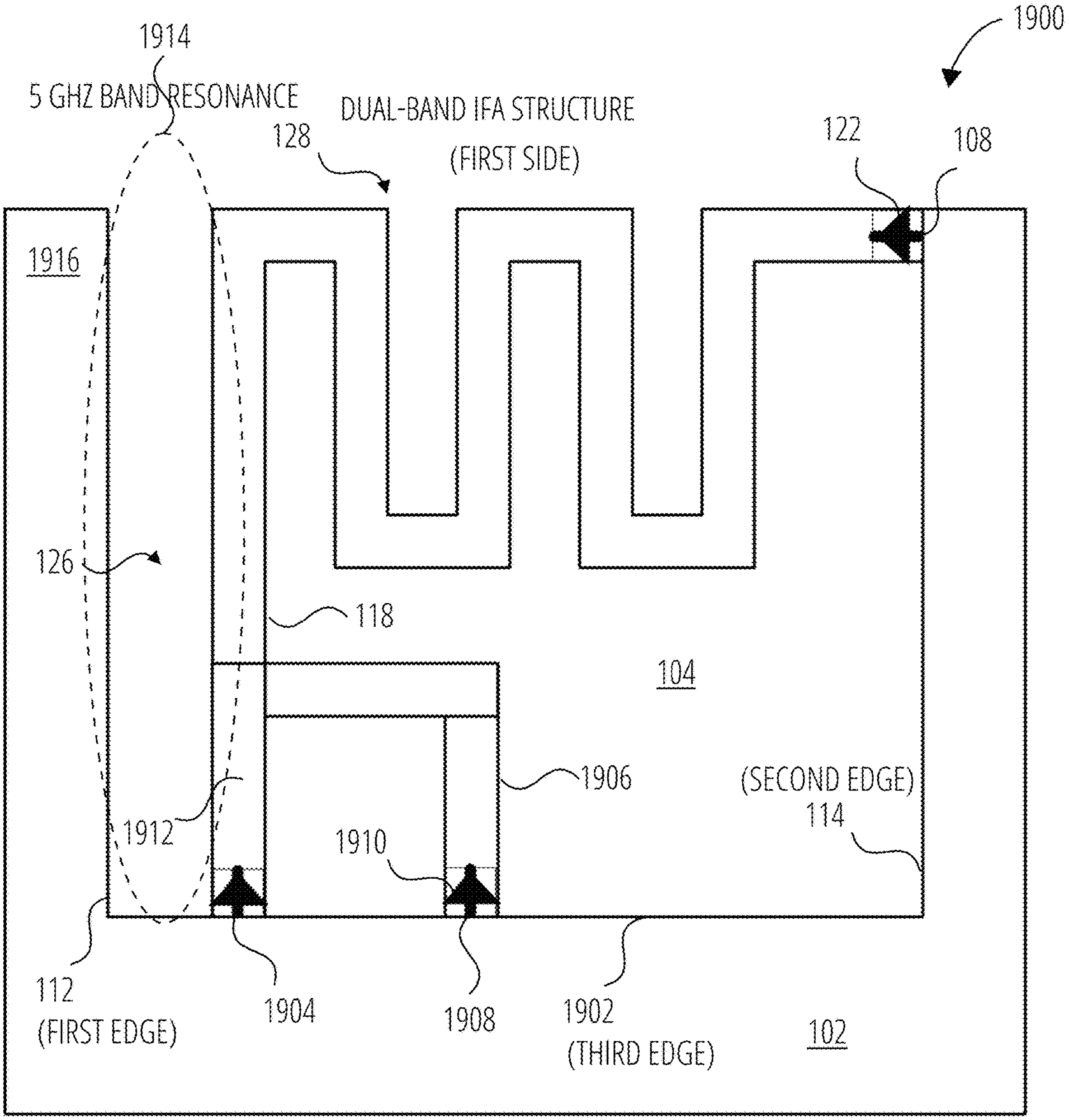
FIG. 19 illustrates a dual-band IFA structure near a corner of a PCB according to at least one embodiment.

FIG. 19 illustrates a dual-band IFA structure 1900 near a corner of a PCB according to at least one embodiment. The dual-band IFA structure 1900 is similar to dual-band IFA structure 100 as noted by similar reference numbers, except the dual-band IFA structure 1900 includes a different location for a feed point 1904 and a second grounding point 1908. The feed point 1904 and the second grounding point 1908 are located on a third edge 1902 of the opening 104. A feed arm 1912 is coupled between the feed point 1904 and the radiating arm 118. The feed arm 1912 and the radiating arm 118 are located on a same line parallel to the first edge 112.

In at least one embodiment, the radiating arm 118 has the first portion 126 of the conductive trace parallel to the first edge 112. The first portion 126 of the conductive trace and the corresponding gap between the ground plane 102 contribute to a 5 GHz band resonance 1914. A portion 1916 of the ground plane 102 is needed with a minimum width, but the dual-band IFA structure 1900 can be located near a corner of a PCB. The radiating arm 118 includes the second portion 128 of the conductive trace having the meandering path between the proximal end at the distal end of the first portion 126 of the conductive trace and the distal end at the first grounding point 108. The first portion 126 of the conductive trace and the second portion 128 of the conductive trace contribute to a 2.4 GHz band resonance (not illustrated in FIG. 19).

Figure 20:
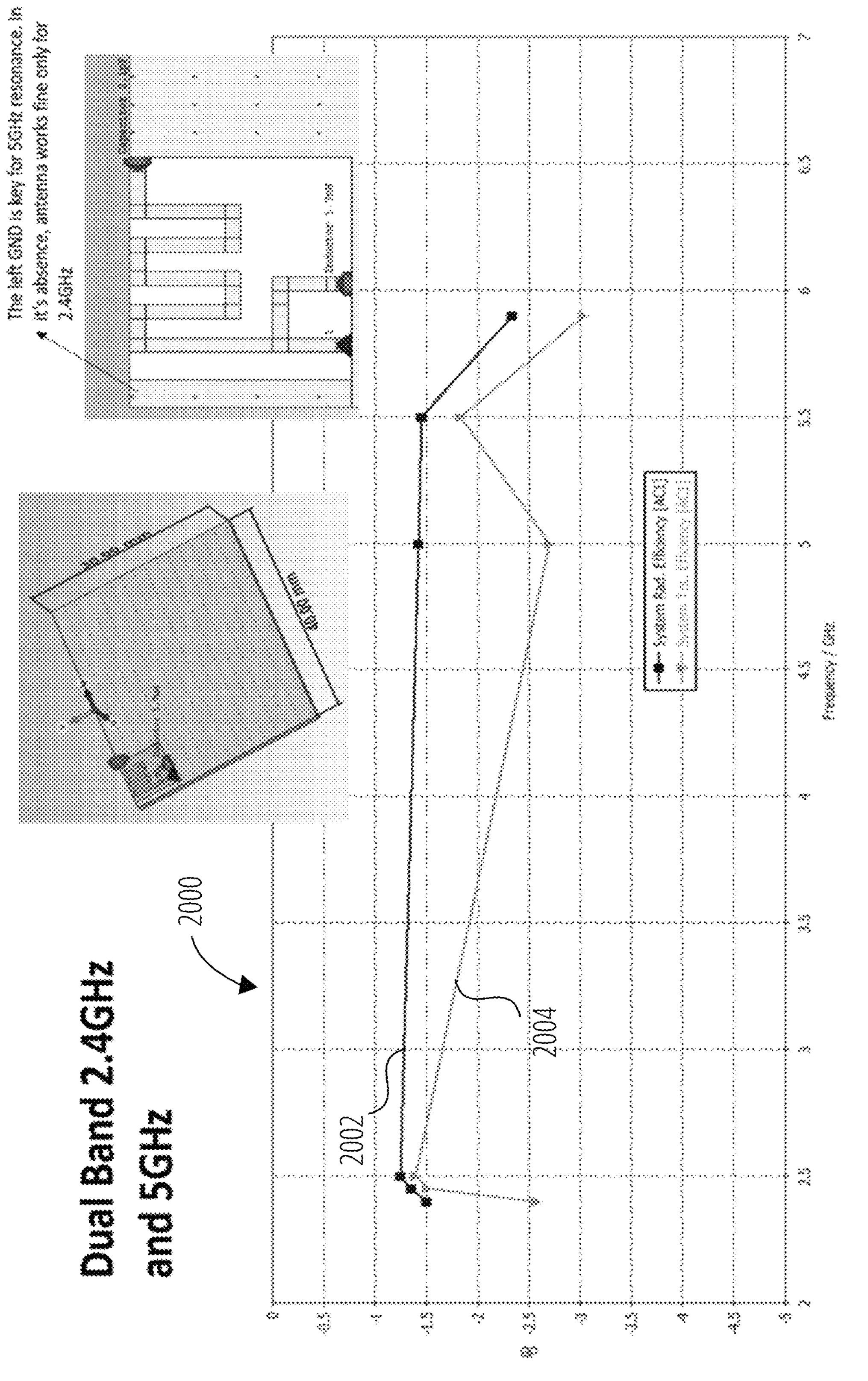
FIG. 20 is a graph illustrating the efficiency of the dual-band IFA structure of FIG. 19 in dB, according to at least one embodiment.

FIG. 20 is a graph 2000 illustrating the efficiency of the dual-band IFA structure of FIG. 19 in dB, according to at least one embodiment. The graph 2000 illustrates the radiation efficiency 2002 and a total efficiency 2004. The total efficiency of the dual-band IFA structure 1900 can be measured by including the loss of the structure and mismatch loss. The graph 2000 shows that the dual-band IFA structure 1900 is a viable antenna for the 2.4 GHz frequency band and the 5 GHz frequency band. The graph 2000 shows the efficiency of the dual-band IFA structure 1900 in free space in dBs. The dual-band IFA structure 1900 can be placed either on an edge or at a center of a ground plane. The ground plane can be 40 mm×30 mm in dimensions.

Figure 21:
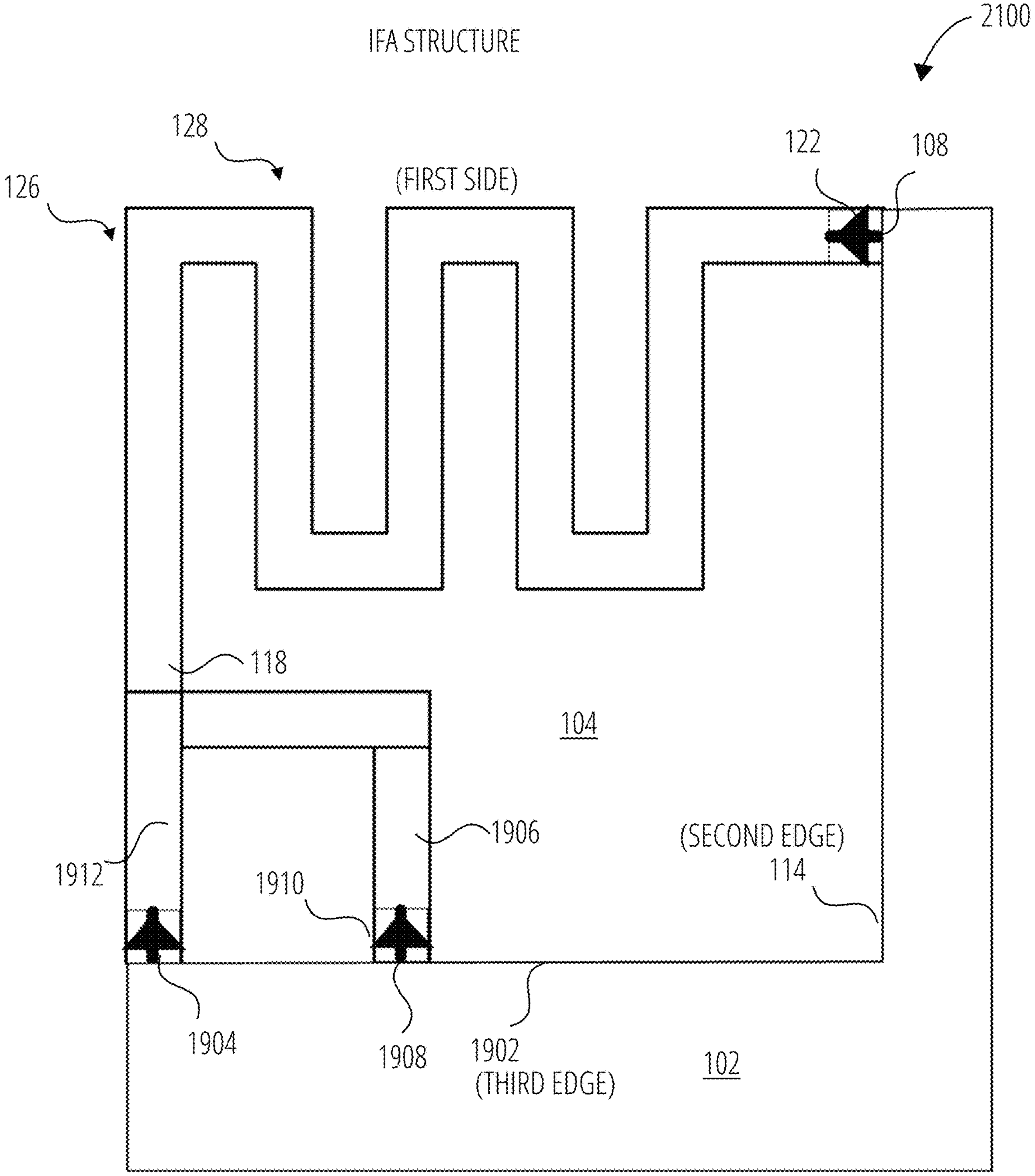
FIG. 21 illustrates an IFA structure near a corner of a PCB according to at least one embodiment.

FIG. 21 illustrates an IFA structure 2100 near a corner of a PCB according to at least one embodiment. The IFA structure 2100 is similar to dual-band IFA structure 1900 as noted by similar reference numbers, except the IFA structure 2100 does not have the portion 1916 and gap on the side of the first portion 126 of the conductive trace to create the 5 GHz band resonance 1914. The radiating arm 118 includes the second portion 128 of the conductive trace having the meandering path between the proximal end at the distal end of the first portion 126 of the conductive trace and the distal end at the first grounding point 108. The first portion 126 of the conductive trace and the second portion 128 of the conductive trace contribute to a 2.4 GHz band resonance (not illustrated in FIG. 21). In this embodiment, the ground plane 102 does not include a first edge adjacent to the opening 104. In this embodiment, the IFA structure 2100 can be located at a corner of the PCB.

Figure 22:
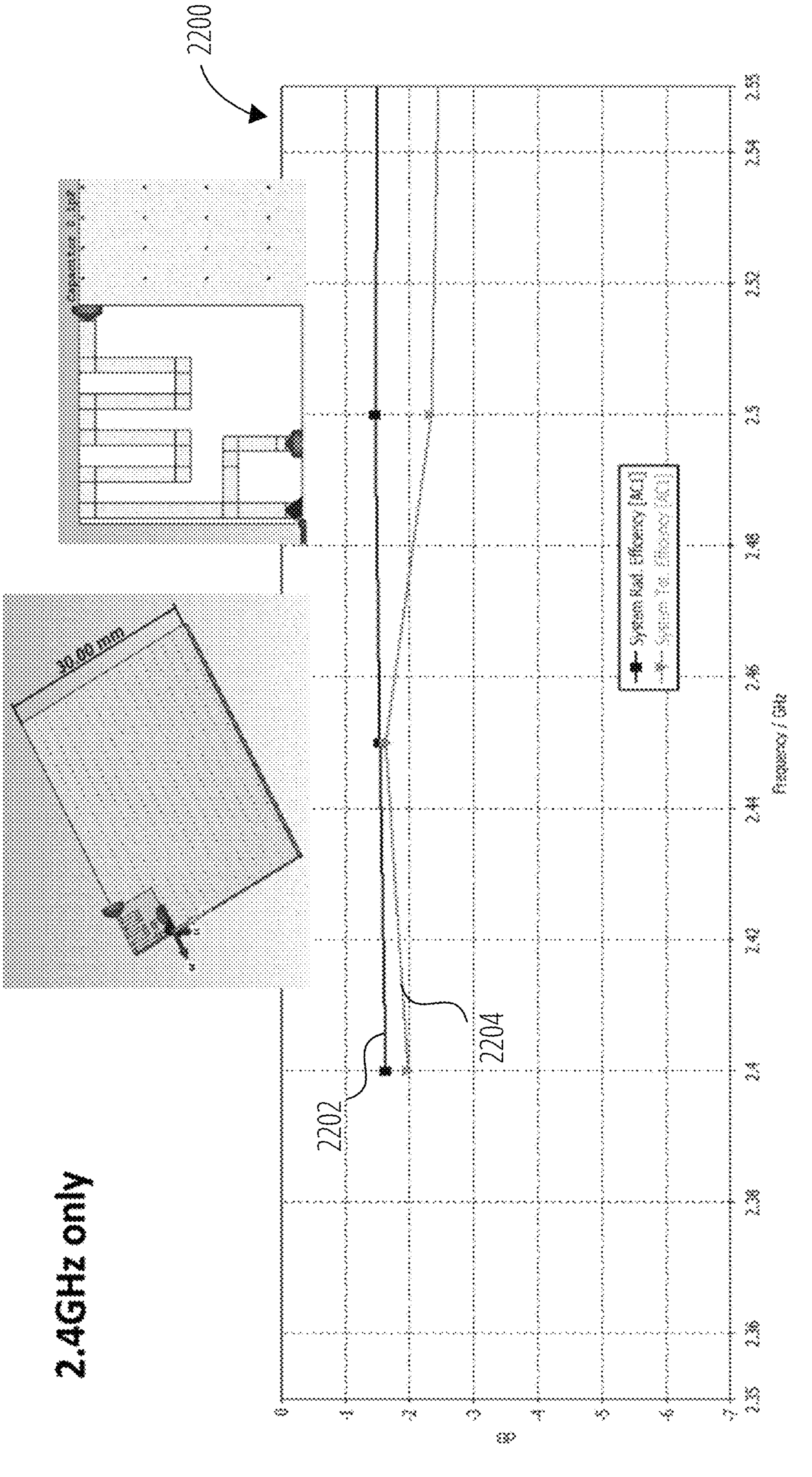
FIG. 22 is a graph illustrating the efficiency of the IFA structure of FIG. 21 in dB, according to at least one embodiment.

FIG. 22 is a graph 2200 illustrating the efficiency of the IFA structure 2100 of FIG. 21 in dB, according to at least one embodiment. The graph 2200 illustrates the radiation efficiency 2202 and a total efficiency 2204. The total efficiency of the IFA structure 2100 can be measured by including the loss of the structure and mismatch loss. The graph 2200 shows that the IFA structure 2100 is a viable antenna for the 2.4 GHz frequency band and the 5 GHz frequency band. The graph 2200 shows the efficiency of the IFA structure 2100 in free space in dBs. The IFA structure 2100 can be placed either on the edge or at the center of the ground plane. The ground plane can be 40 mm×30 mm in dimensions.

In at least one embodiment, a circuit board includes a ground plane with an opening at a side of the circuit board, the opening having a height less than 10 millimeters (mm) and a width less than 10 mm, and a dual-band antenna disposed within the opening. The dual-band antenna includes a feed point, a first grounding point, a second grounding point, a feed arm, a radiating arm, and a shorting arm. The feed point is coupled to a radio. The feed point is located at a first edge of the ground plane adjacent to the opening. The first grounding point is located at a second edge of the ground plane adjacent to the opening and opposite the first edge. The second grounding point is located at the first edge. The second grounding point is located farther away from the side than the feed point. The feed arm is coupled to the feed point. The radiating arm has a proximal end coupled to the feed arm and a distal end coupled to the first grounding point. The shorting arm has a proximal end coupled to the feed arm and a distal end coupled to the second grounding point.

In a further embodiment, the dual-band antenna includes a first tuning component and a second tuning component. The first tuning component is coupled to the distal end of the radiating arm of the dual-band antenna. The first tuning component is configured to cause the dual-band antenna to radiate electromagnetic energy in a first frequency range. The second tuning component is coupled to the distal end of a shorting arm of the dual-band antenna. The second tuning component is configured to cause the dual-band antenna to radiate electromagnetic energy in a second frequency range.

In a further embodiment, the circuit board includes an impedance-matching circuit coupled to the feed point. The first tuning component includes at least a capacitor, and the second tuning component includes at least an inductor.

In at least one embodiment, the radiating arm includes a first portion of the conductive trace having a proximal end at the feed arm and a distal end at the side. The first portion of the conductive trace is parallel to the first edge. The radiating arm includes a second portion of the conductive trace having a meandering path between a proximal end at the distal end of the first portion of the conductive trace and a distal end at the first grounding point.

In at least one embodiment, the circuit board further includes active circuitry located in a first region of the circuit board. The dual-band antenna is located in a second region of the circuit board and configured to generate a surface current with a null in the first region.

In at least one embodiment, the circuit board further includes an area where a conductive fastener physically couples the circuit board to a metal structure. The conductive fastener can divert surface currents from the circuit board, caused by the dual-band antenna, to the metal structure. In at least one embodiment, the dual-band antenna is configured to radiate electromagnetic energy in the 2.4 GHz frequency band and the 5 GHz frequency band.

In accordance with one or more preferred implementations, a printed antenna comprises two parallel printed trace sections forming part of a first path from a first end point of a printed trace to a second end point of the printed trace. The printed antenna further comprises five parallel printed trace sections forming part of a second path from the first end point of the printed trace to a third end point of the printed trace. The printed antenna further comprises a connecting printed trace section connecting one of the two parallel printed trace sections to one of the five parallel printed trace sections. A first inductor element is disposed at the first end point, and a first capacitor element is disposed at the third end point.

In accordance with one or more preferred implementations, a printed antenna comprises a first u-shaped section forming part of a first path from a first end point of a printed trace to a second end point of the printed trace, a second u-shaped section forming part of a second path from the first end point of the printed trace to a third end point of the printed trace, and a third u-shaped section forming part of the second path between the second end point of the printed trace and a third end point of the printed trace. A first inductor element is disposed at the first end point, and a first capacitor element is disposed at the third end point.

Figure 23:
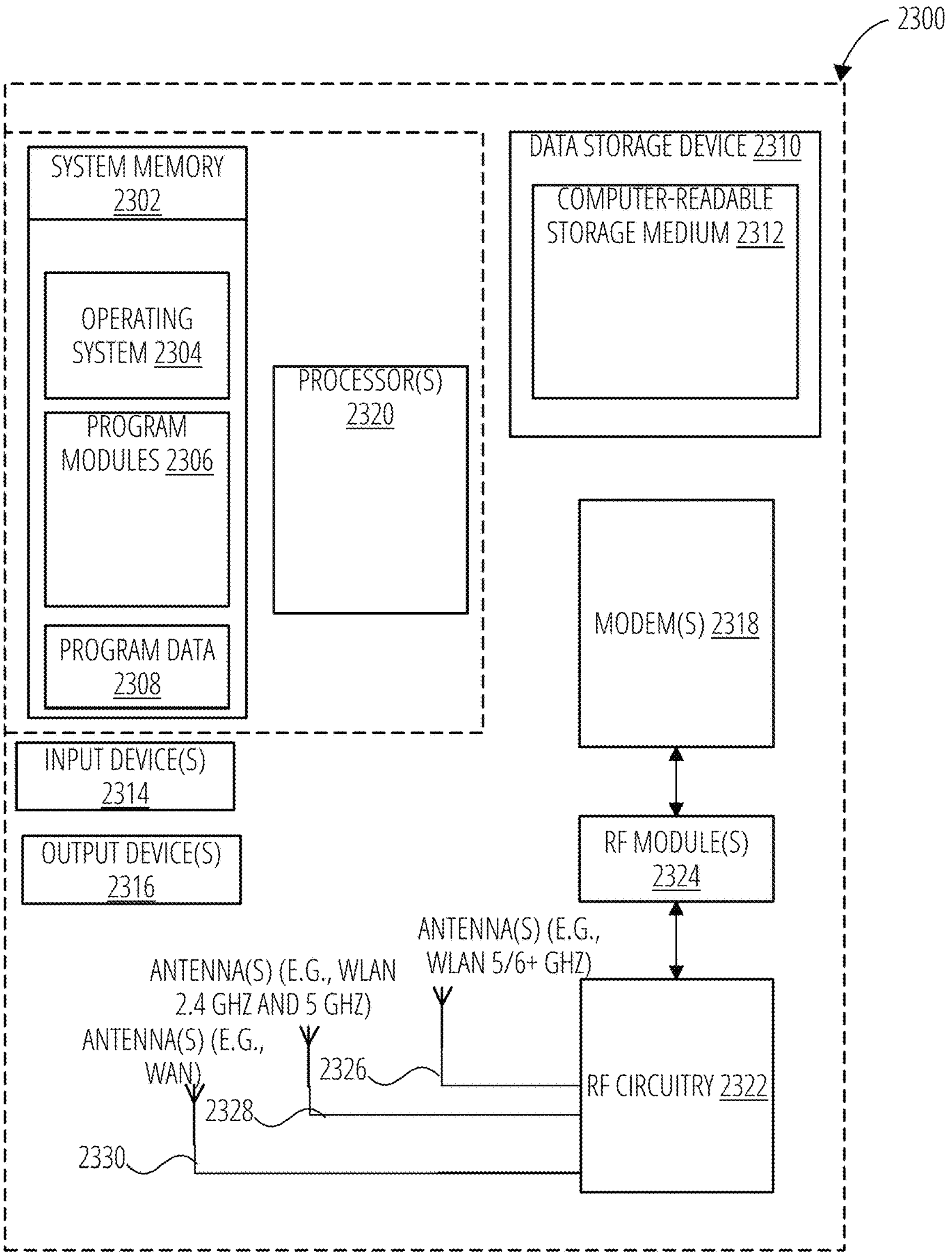
FIG. 23 is a block diagram of an electronic device with a dual-band IFA structure, according to at least one embodiment of the present disclosure.

FIG. 23 is a block diagram of an electronic device 2300 with a dual-band antenna, according to at least one embodiment of the present disclosure. The electronic device 2300 may correspond to the user devices described herein. The electronic device 2300 includes one or more processor(s) 2320, such as one or more central processing units (CPUs), microcontrollers, field-programmable gate arrays, or other types of processors. The electronic device 2300 also includes system memory 2302, which may correspond to any combination of volatile and/or non-volatile storage mechanisms. The system memory 2302 stores information that provides operating system component 2304, various program modules 2306, program data 2308, and/or other components. The program modules 2306 may include instructions. In one embodiment, the system memory 2302 stores instructions of methods to control the operation of the electronic device 2300. The electronic device 2300 performs functions using the processor(s) 2320 to execute instructions provided by the system memory 2302.

The electronic device 2300 also includes a data storage device 2310 that may be composed of one or more types of removable storage and/or one or more types of non-removable storage. The data storage device 2310 includes a computer-readable storage medium 2312 on which is stored one or more sets of instructions embodying any of the methodologies or functions described herein. Instructions for the program modules 2306 may reside, completely or at least partially, within the computer-readable storage medium 2312, system memory 2302 and/or within the processor(s) 2320 during execution thereof by the electronic device 2300, the system memory 2302, and the processor(s) 2320 also constituting computer-readable media. The electronic device 2300 may also include one or more input device(s) 2314 (keyboard, mouse device, specialized selection keys, etc.) and one or more output device(s) 2316 (displays, printers, audio output mechanisms, etc.).

The electronic device 2300 further includes a modem(s) 2318 to allow the electronic device 2300 to communicate via wireless connections (e.g., provided by the wireless communication system) with other computing devices, such as remote computers, an item-providing system, and so forth. The modem(s) 2318 can be connected to one or more radio frequency (RF) modules 2324. The RF module(s) 2324 may be a WLAN module, a Wide Area Network (WAN) module, a personal area network (PAN) module, a Global Positioning System (GPS) module, or the like. The antenna structures (antenna(s) 2326, 2328, and 2330) are coupled to the RF circuitry 2322, which is coupled to the modem(s) 2318. In at least one embodiment, the antenna 2328 can be the dual-band IFA structure 100 of FIG. 1A and FIG. 1B, the dual-band IFA structure 1202 of FIG. 12, the dual-band IFA structure 1500 of FIG. 15, the dual-band antenna 1600 of FIG. 16, the dual-band IFA structure 1700 of FIG. 17, the dual-band IFA structure 1900 of FIG. 19, the IFA structure 2100 of FIG. 21. The RF circuitry 2322 may include radio front-end circuitry, antenna switching circuitry, impedance-matching circuitry, or the like. In one embodiment, the Rf circuitry 2322 includes the radio frequency front-end (RFFE) circuitry with high selectivity performance as described in the various embodiments of FIG. 1A to FIG. 22. The antennas antenna 2326 may be GPS antennas, Near-Field Communication (NFC) antennas, other WAN antennas, WLAN or PAN antennas, or the like.

The modem(s) 2318 allows the electronic device 2300 to manage both voice and non-voice communications (such as communications for text messages, multimedia messages, media downloads, web browsing, etc.) with a wireless communication system. The modem(s) 2318 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 2318 may generate signals and send these signals to antenna(s) 2326 of a first type (e.g., WLAN 5/6+ GHz), antenna(s) 2328 of a second type (e.g., WLAN 2.4 GHz), and/or antenna(s) 2330 of a third type (e.g., WAN), via Rf circuitry 2322, and Rf module(s) 2324 as described herein. Antennas 2326, 2328, 2330 may be configured to transmit in different frequency bands and/or using different wireless communication protocols. The antennas 2326, 2328, 2330 may be directional, omnidirectional, or non-directional antennas. In addition to sending data, antennas 2326, 2328, 2330 may also receive data, which is sent to appropriate RF modules connected to the antennas. One of the antennas 2326, 2328, 2330 may be any combination of the antenna structures described herein.

In one embodiment, the electronic device 2300 establishes a first connection using a first wireless communication protocol and a second connection using a different wireless communication protocol. The first wireless connection and second wireless connection may be active concurrently, for example, if an electronic device is receiving a media item from another electronic device via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band. The second wireless connection is associated with a second resonant mode of the antenna structure that operates at a second frequency band. In another embodiment, the first wireless connection is associated with a first antenna structure, and the second wireless connection is associated with a second antenna.

Though a modem 2318 is shown to control transmission and reception via antenna (2326, 2328, 2330), the electronic device 2300 may alternatively include multiple modems, each of which is configured to transmit/receive data via a different antenna and/or wireless transmission protocol.

What is claimed is:

1. A wireless device comprising:
- a metal structure;
- a wireless local area network (WLAN) radio;
- a circuit board comprising a ground plane and an inverted-F antenna (IFA) structure located at an opening in the ground plane, the opening being located at a side of the ground plane, wherein the IFA structure comprises:
  - a feed point coupled to the WLAN radio, wherein the feed point is located at a first edge of the ground plane opposite to the opening;
  - a first grounding point located at a second edge of the ground plane adjacent to the opening;
  - a second grounding point located at the first edge, the second grounding point being located farther away from the side than the feed point;
  - a feed arm coupled to the feed point;
  - a radiating arm coupled to the feed arm and the first grounding point;
  - a shorting arm coupled to the radiating arm and the second grounding point;
  - a first tuning component coupled to a distal end of the radiating arm and the first grounding point, wherein the first tuning component is configured to cause the IFA structure to radiate electromagnetic energy in a first frequency range; and
  - a second tuning component coupled to a distal end of the shorting arm and the second grounding point, wherein the second tuning component is configured to cause the IFA structure to radiate electromagnetic energy in a second frequency range.

2. The wireless device of claim 1, wherein the IFA structure is located at a second side of the ground plane, wherein the side and the second side are adjacent sides.

3. The wireless device of claim 1, wherein a first portion of the radiating arm is parallel to a third edge of the ground plane, the third edge being adjacent the first edge and opposite the second edge.

4. The wireless device of claim 1, further comprising:
- a heatsink; and
- one or more conductive spring clips coupled between the circuit board and the heatsink, wherein the one or more conductive spring clips is to divert surface currents from the circuit board, caused by the IFA structure, to the heatsink to minimize noise coupling from a circuit of the circuit board to the IFA structure.

5. The wireless device of claim 1, wherein the IFA structure fits within the opening having a height of 7 millimeters (mm) and a width of 8 mm.

6. The wireless device of claim 1, wherein the IFA structure is less than 10 millimeters in a first dimension and less than 10 millimeters in a second, perpendicular dimension.

7. The wireless device of claim 1, wherein the IFA structure fits within the opening having a height of less than 10 millimeters (mm) and a width of less than 10 mm.

8. The wireless device of claim 1, further comprising an impedance-matching circuit coupled between the WLAN radio and the feed point, wherein the first tuning component comprises a capacitor, and wherein the second tuning component comprises an inductor.

9. The wireless device of claim 1, further comprising:
- active circuitry located in a first region of the circuit board, wherein the IFA structure is located in a second region of the circuit board and configured to generate a surface current with a null in the first region.

10. A circuit board comprising:
- a ground plane; and
- an inverted-F antenna (IFA) structure located at an opening in the ground plane, the opening being located at a side of the ground plane, wherein the IFA structure comprises:
  - a feed point located at a first edge of the ground plane opposite to the opening;
  - a first grounding point located at a second edge of the ground plane adjacent to the opening;
  - a second grounding point located at the first edge, the second grounding point being located farther away from the side than the feed point;
  - a feed arm coupled to the feed point;
  - a radiating arm coupled to the feed arm and the first grounding point;
  - a shorting arm coupled to the radiating arm and the second grounding point;
  - a first tuning component coupled to a distal end of the radiating arm and the first grounding point, wherein the first tuning component is configured to cause the IFA structure to radiate electromagnetic energy in a first frequency range; and a second tuning component coupled to a distal end of the shorting arm and the second grounding point, wherein the second tuning component is configured to cause the IFA structure to radiate electromagnetic energy in a second frequency range.

11. The circuit board of claim 10, wherein the IFA structure is located at a second side of the ground plane, wherein the side and the second side are adjacent sides.

12. The circuit board of claim 10, wherein a first portion of the radiating arm is parallel to a third edge of the ground plane, the third edge being adjacent the first edge and opposite the second edge.

13. The circuit board of claim 10, wherein the IFA structure fits within the opening having a height of 7 millimeters (mm) and a width of 8 mm.

14. The circuit board of claim 10, wherein the IFA structure is less than 10 millimeters in a first dimension and less than 10 millimeters in a second, perpendicular dimension.

15. The circuit board of claim 10, wherein the IFA structure fits within the opening having a height of less than 10 millimeters (mm) and a width of less than 10 mm.

16. The circuit board of claim 10, further comprising an impedance-matching circuit coupled to the feed point, wherein the first tuning component comprises a capacitor, and wherein the second tuning component comprises an inductor.

17. The circuit board of claim 10, further comprising:

active circuitry located in a first region of the circuit board, wherein the IFA structure is located in a second region of the circuit board and configured to generate a surface current with a null in the first region.

18. An electronic device comprising:

a radio;

a circuit board comprising a ground plane and an inverted-F antenna (IFA) structure located at an opening in the ground plane, the opening being located at a side of the ground plane, wherein the IFA structure comprises:

a feed point coupled to the radio, wherein the feed point is located at a first edge of the ground plane opposite to the opening;

a first grounding point located at a second edge of the ground plane adjacent to the opening;

a second grounding point located at the first edge, the second grounding point being located farther away from the side than the feed point;

a feed arm coupled to the feed point;

a radiating arm coupled to the feed arm and the first grounding point;

a shorting arm coupled to the radiating arm and the second grounding point;

a first tuning component coupled to a distal end of the radiating arm and the first grounding point, wherein the first tuning component is configured to cause the IFA structure to radiate electromagnetic energy in a first frequency range; and a second tuning component coupled to a distal end of the shorting arm and the second grounding point, wherein the second tuning component is configured to cause the IFA structure to radiate electromagnetic energy in a second frequency range.

19. The electronic device of claim 18, wherein the IFA structure is located at a second side of the ground plane, wherein the side and the second side are adjacent sides.

20. The electronic device of claim 18, wherein a first portion of the radiating arm is parallel to a third edge of the ground plane, the third edge being adjacent the first edge and opposite the second edge.

* * * * *